US012631545B2

(12) United States Patent　　　　(10) Patent No.: US 12,631,545 B2
Bahr et al.　　　　　　　　　　　　 (45) Date of Patent: May 19, 2026

(54) METHOD AND SYSTEMS FOR DETERMINING DROP DELAY USING SCATTER SIGNALS ACROSS SPATIALLY SEPARATED LASERS

(71) Applicant: Becton, Dickinson and Company, Franklin Lakes, NJ (US)

(72) Inventors: Matthew Bahr, San Jose, CA (US); Christopher Ghazi, San Jose, CA (US); Keegan Owsley, Campbell, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 270 days.

(21) Appl. No.: 17/545,646

(22) Filed: Dec. 8, 2021

(65) Prior Publication Data

US 2022/0236164 A1　　　Jul. 28, 2022

Related U.S. Application Data

(60) Provisional application No. 63/141,272, filed on Jan. 25, 2021.

(51) Int. Cl.
G01N 15/1434　　　(2024.01)
G01F 1/661　　　　(2022.01)
　　　　(Continued)

(52) U.S. Cl.
CPC ......... G01N 15/1434 (2013.01); G01F 1/661 (2013.01); *G01N 2015/1006* (2013.01); *G01N 2015/1438* (2013.01); *G01N 15/149* (2024.01)

(58) Field of Classification Search
None
See application file for complete search history.

(56) References Cited

U.S. PATENT DOCUMENTS 6,248,590 B1　　6/2001　Malachowski
6,372,506 B1　　4/2002　Norton
　　　　(Continued)

FOREIGN PATENT DOCUMENTS

CN　　　111948118 A　 *　11/2020　......... G01N 15/1425
GB　　　2544285 A　 *　5/2017　........... G01N 1/2211
　　　　(Continued)

OTHER PUBLICATIONS

Atashkhooei, Reza, et al. "Optical feedback flowmetry: Impact of particle concentration on the signal processing method." IEEE Sensors Journal 18.4 (2017): 1457-1463. (Year: 2017).*

*Primary Examiner* — Rufus L Phillips
(74) *Attorney, Agent, or Firm* — David N. Armstrong; Bret E. Field; BOZICEVIC, FIELD & FRANCIS LLP

(57)　　　　ABSTRACT

Aspects of the present disclosure include methods for determining drop delay of a particle in a flow stream (e.g., in a particle analyzer). Methods according to certain embodiments include irradiating the particle in the flow stream with two or more spatially separated lasers, detecting light from the particle in a first photodetector channel and a second photodetector channel calculating a velocity of the particle in the flow stream based on the detected light in the first photodetector channel and the second photodetector channel and determining the drop delay of the particle based on the calculated velocity. Systems (e.g., particle analyzers) having a light source with two or more spatially separated lasers and a light detection system for practicing the subject methods are also described. Integrated circuits and non-transitory computer readable storage medium having instructions stored thereon for determining drop delay according to the subject methods are also provided.

21 Claims, 10 Drawing Sheets

(51) Int. Cl.
    *G01N 15/10*        (2024.01)
    *G01N 15/149*      (2024.01)

(56)          References Cited

U.S. PATENT DOCUMENTS

| | | | |
|---|---|---|---|
| 9,339,823 B2* | 5/2016 | Muraki | G01N 15/1459 |
| 2002/0081744 A1* | 6/2002 | Chan | B01L 3/502761 |
| | | | 436/164 |
| 2010/0297759 A1* | 11/2010 | Kanda | G01N 33/5005 |
| | | | 435/286.1 |
| 2012/0200857 A1* | 8/2012 | Sharpe | G01N 15/14 |
| | | | 356/436 |
| 2013/0337575 A1 | 12/2013 | Fox et al. | |
| 2018/0095024 A1* | 4/2018 | Norton | G01N 15/1425 |
| 2018/0313740 A1* | 11/2018 | Otsuka | G01N 15/1425 |
| 2019/0331587 A1* | 10/2019 | Roberts | G01N 15/1429 |
| 2020/0141856 A1* | 5/2020 | Yan | G01N 15/1463 |

FOREIGN PATENT DOCUMENTS

| | | | |
|---|---|---|---|
| JP | 2007533971 A | 11/2007 |
| JP | 2009145213 A | 7/2009 |
| JP | 2020512528 A | 4/2020 |

* cited by examiner

Figure 2A

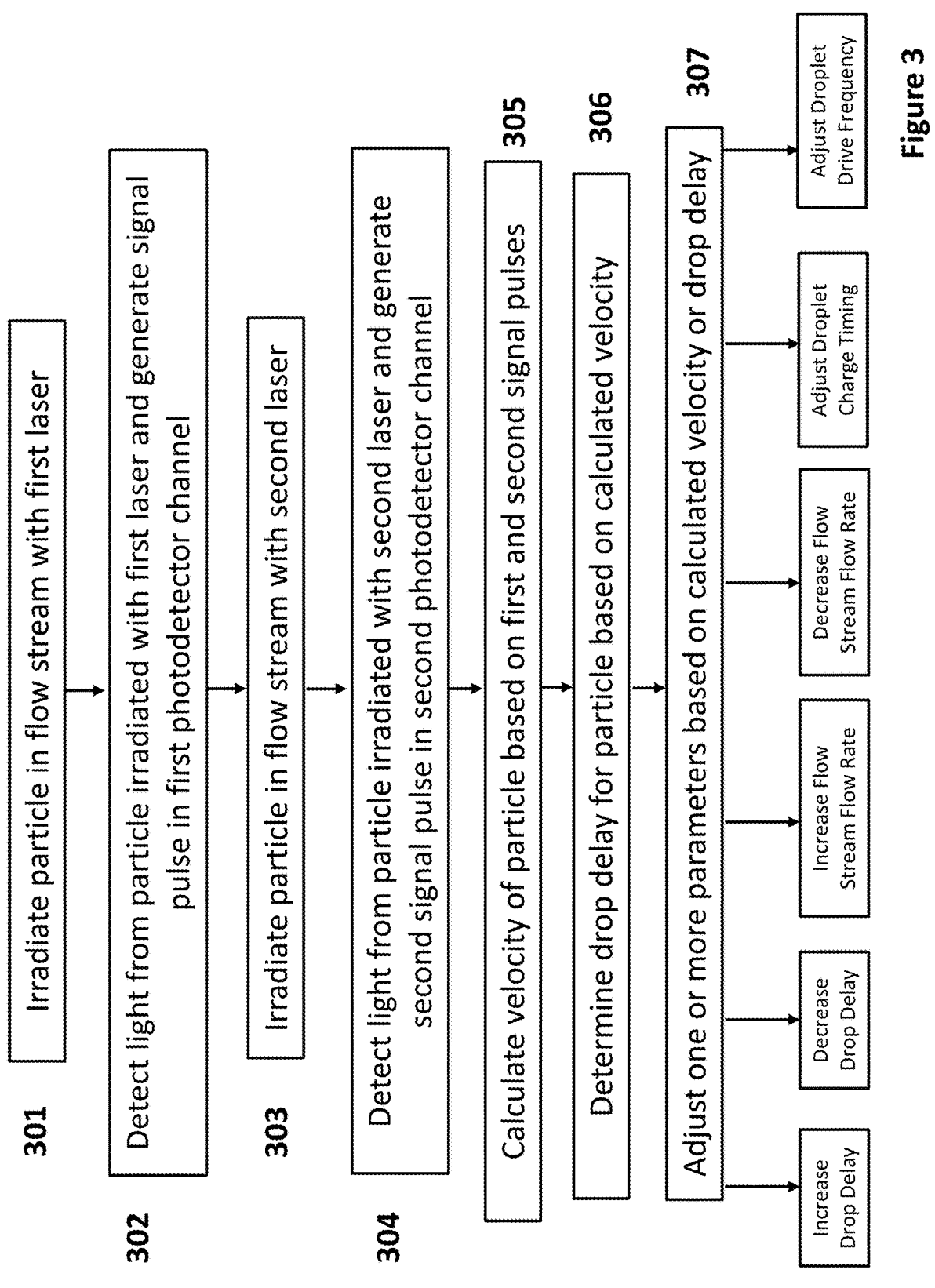

301   Irradiate particle in flow stream with first laser

302   Detect light from particle irradiated with first laser and generate signal pulse in first photodetector channel

303   Irradiate particle in flow stream with second laser

304   Detect light from particle irradiated with second laser and generate second signal pulse in second photodetector channel

305   Calculate velocity of particle based on first and second signal pulses

306   Determine drop delay for particle based on calculated velocity

307   Adjust one or more parameters based on calculated velocity or drop delay Increase Drop Delay Decrease Drop Delay Increase Flow Stream Flow Rate Decrease Flow Stream Flow Rate Adjust Droplet Charge Timing Adjust Droplet Drive Frequency

Figure 3

METHOD AND SYSTEMS FOR DETERMINING DROP DELAY USING SCATTER SIGNALS ACROSS SPATIALLY SEPARATED LASERS

CROSS-REFERENCE

Pursuant to 35 U.S.C. § 119 (e), this application claims priority to the filing date of U.S. Provisional Patent Application Ser. No. 63/141,272 filed Jan. 25, 2021; the disclosure of which application is incorporated herein by reference in their entirety.

INTRODUCTION

Flow cytometers are used for analyzing and sorting particles in a fluid sample, such as cells of a blood sample or particles of interest in any other type of biological or chemical sample. Within a flow cell, a liquid sheath is formed around the particle-containing stream to impart a substantially uniform velocity on the flow stream. The flow stream exits the flow cell via a nozzle with a nozzle diameter that is appropriate for the fluidics system and sort rate desired. The flow cell hydrodynamically focuses the particles (e.g., cells) within the stream to pass through the center of an irradiation source (e.g. laser beam). The intersection at which the particles of interest in the flow stream pass through the irradiation source is often referred to as the interrogation point. As particles of interest (e.g., cells) move through the interrogation point, light from the irradiation source (e.g., laser) is scattered. The light can also excite components in the cell stream that have fluorescent properties, such as fluorescent markers that have been added to the fluid sample and adhered to certain cells of interest.

In flow cytometers that sort cells by an electrostatic method, the desired cells are contained within an electrically charged droplet. To charge the droplet, the flow cell includes a charging element. Since the cell stream exits the flow cell in a substantially downward vertical direction, the droplets also propagate in that direction after they are formed. When a target particle is detected by an interrogating laser, a charge is applied to the droplet that contains the target particle. The drop delay value is the distance in time between the laser interrogation point where a target particle is detected and the point where the droplet breaks off from the continuous flow stream. Above the break-off point, the flow stream is continuous and connected; below it, the flow stream is disjunct as discrete droplets. Generally, the drop delay is the amount of time (in drop equivalents) that a cell sorter will wait before applying a charge to the droplet after detecting the target particle with the interrogating laser. Variability in the size of particles present in the flow stream or drift in the flow cytometer components can impact the predictability of whether a drop in the flow stream contains a particle of interest. Inaccurate predictions of droplets that contain particles (e.g., applying a charge to the wrong droplet) can be detrimental to qualitative analysis, resulting in imprecise cell sorting, contamination of sorted samples as well as quantitative loss of biological sample.

SUMMARY

Aspects of the present disclosure include methods for determining drop delay for a plurality of particles in a flow stream (e.g., in a particle analyzer). Methods according to certain embodiments include irradiating a sample having a plurality of particles in the flow stream with two or more spatially separated lasers, detecting light from each particle in a first photodetector channel and a second photodetector channel, calculating a velocity of each particle in the flow stream based on the detected light in the first photodetector channel and the second photodetector channel and determining the drop delay of each particle based on the calculated velocity. In embodiments, methods include irradiating the particles in the flow stream with a first laser in a first interrogation region and a second laser in a second interrogation region. In some embodiments, the second interrogation region is at a position downstream from the first laser.

In some embodiments, methods include generating a first photodetector signal pulse in response to the light detected in the first photodetector channel; and generating a second photodetector signal pulse in response to the light detected in the second photodetector channel. In some embodiments, each of the signal pulses are voltage pulses outputted in each photodetector channel. In some embodiments, the signal pulses in each photodetector channel are generated from scattered light from the irradiated particle. In certain embodiments, the signal pulse in the first photodetector channel is generated in response to scattered light from each particle irradiated by the first laser and the signal pulse in the second photodetector channel is generated in response to scattered light from each particle irradiated by the second laser.

To calculate the velocity of the particle in the flow stream in some instances, an amount of time between the photodetector signal pulses is determined. In other instances, a time-to-peak between the photodetector signal pulses is determined. In other instances, a first order moment of the photodetector signal pulses is determined. In some instances, the velocity of each particle in the flow stream is calculated based on the amount of time between the first photodetector signal pulse and the second photodetector signal pulse and the distance between the interrogation region of the first laser and the interrogation region of the second laser. In other instances, the velocity of each particle in the flow stream is calculated based on the time-to-peak between the first photodetector signal pulse and the second photodetector signal pulse and the distance between the interrogation region of the first laser and the interrogation region of the second laser. In other the velocity of each particle in the flow stream is calculated based on the first order moment of the photodetector signal pulses and the distance between the interrogation region of the first laser and the interrogation region of the second laser.

In some embodiments, the particle analyzer includes a flow cell having a flow cell nozzle for generating a droplet containing each particle in the sample, such as for sorting particles of the sample. In certain instances, the drop delay of each particle is determined by multiplying the calculated velocity of the particle in the flow stream by the distance between the first interrogation region or second interrogation region and an orifice of the flow cell nozzle. In some embodiments, methods further include adjusting the drop delay for particles in the sample based on one or more of the calculated velocity of each particle in the flow stream and the calculated drop delay. In other embodiments, the method further includes adjusting one or more parameters of the particle analyzer based on one or more of the calculated velocity of each particle in the flow stream and the calculated drop delay. For example, methods may include increasing or decreasing the flow stream based on based on one or more of the calculated velocity of the particle in the flow stream and the calculated drop delay. In certain instances, the timing of droplet charging (e.g., in a particle sorter) may be adjusted.

In certain embodiments, the sample in the flow stream is irradiated with a plurality of lasers and light from each particle is detected in a plurality of photodetector channel. A photodetector signal pulse is generated in response to light detected in each of the photodetector channels and a velocity for each particle is calculated based on the photodetector signal pulses generated in two or more of the photodetector channels. In some instances, light from each of the plurality of lasers is detected in a separate detector channel. In some instances, the plurality of lasers are positioned to irradiate the flow stream at positions that are spaced apart from each other by 200 μm, such as 150 μm, such as 120 μm or less, such as 100 μm or less, such as 50 μm or less 10 μm or less, and in some instances ranging from 1 to 200 μm, such as 10 to 150 μm. In certain instances, the plurality of lasers includes a first laser configured to irradiate the flow stream in a first interrogation region, a second laser configured to irradiate the flow stream in a second interrogation region that is downstream from the first interrogation region, a third laser configured to irradiate the flow stream in a third interrogation region that is downstream from the second interrogation region and a fourth laser that is configured to irradiate the flow stream in a fourth interrogation region that is downstream from the third interrogation region. In certain embodiments, the velocity of each particle irradiated in the flow stream is calculated based on the photodetector signal pulses generated in three or more of the photodetector channels. In certain instances, the velocity of each particle irradiated in the flow stream is calculated based on the photodetector signal pulses generated in all of the photodetector channels.

In certain instances, one or more of the velocity and the drop delay for each particle is calculated on an integrated circuit. In some embodiments, the integrated circuit is a field programmable gate array (FPGA). In some embodiments, the integrated circuit is an application specific integrated circuit (ASIC). In some embodiments, the integrated circuit is a complex programmable logic device (CPLD).

Aspects of the present disclosure also include systems for practicing the subject methods. In some embodiments, systems include a light source having a first laser and a second laser that is configured to irradiate a plurality of particles of a sample in a flow stream with the first laser in a first interrogation region and the second laser in a second interrogation region, a light detection system having a photodetector configured to detect light from each particle in a first photodetector channel and a second photodetector channel and a processor with memory operably coupled to the processor where the memory has instructions stored thereon, which when executed by the processor, cause the processor to calculate a velocity for each particle in the flow stream based on detected light in the first photodetector channel and the second photodetector channel and determine the drop delay of each particle based on the calculated velocity for the particle. In some instances, the second laser is configured to irradiate the flow stream at a position downstream from the first laser, such as at a position that is 200 μm, such as 150 μm, such as 120 μm or less, such as 100 μm or less, such as 50 μm or less 10 μm or less, and in some instances ranging from 1 to 200 μm, such as 10 to 150 μm downstream from the first laser.

In some embodiments, the memory includes instructions which cause the processor to generate a first photodetector signal pulse in response to the light detected in the first photodetector channel and generate a second photodetector signal pulse in response to the light detected in the second photodetector channel. In some instances, the memory includes instructions which cause the processor to determine an amount of time between the first photodetector signal pulse and the second photodetector signal pulse. In some instances, the memory includes instructions which cause the processor to determine a time-to-peak between the first photodetector signal pulse and the second photodetector signal pulse. In some instances, the memory includes instructions which cause the processor to determine the first order moment of the first photodetector signal pulse and the second photodetector signal pulse. In some embodiments, one or more of the photodetector signal pulses is a voltage pulse. In certain embodiments, each of the photodetector signal pulses are voltage pulses. In some instances, the photodetector is configured to detect scattered light from the particle. In certain instances, light detected in the first detector channel is scattered light from the particle irradiated by the first laser. In certain instances, light detected in the second detector channel is scattered light from the particle irradiated by the second laser.

In some embodiments, the memory includes instructions for calculating the velocity of each particle in the flow stream based on the amount of time between the first photodetector signal pulse and the second photodetector signal pulse and a distance between the interruption region of the first laser and the interrogation region of the second laser. In some instances, the particle analyzer includes a flow cell having a flow cell nozzle for generating a droplet containing each particle. In some instances, the memory includes instructions for calculating drop delay for each particle in the flow stream by multiplying the calculated velocity for each particle in the flow stream by the distance between the first interrogation region or second interrogation region and an orifice of the flow cell nozzle. In some instances, the memory includes instructions for adjusting the drop delay based on one or more of the calculated velocity for each particle in the flow stream and the calculated drop delay. In some instances, the memory includes instructions for adjusting one or more parameters of the particle analyzer based on one or more of the calculated velocity for each particle in the flow stream and the calculated drop delay. In certain instances, the memory includes instructions for increasing the flow rate of the flow stream based on one or more of the calculated velocity for each particle in the flow stream and the calculated drop delay. In other instances, the memory includes instructions for decreasing the flow rate of flow stream based on one or more of the calculated velocity for each particle in the flow stream and the calculated drop delay. In certain instances, the memory includes instructions for adjusting the timing of droplet charging based on one or more of the calculated velocity for each particle in the flow stream and the calculated drop delay.

In some embodiments, systems include a light source having a plurality of lasers and a light detection system configured to detect light from particles in the flow stream in a plurality of photodetector channels. In some instances, systems include memory having instructions for generating a photodetector signal pulse in response to the detected light in each of the plurality of photodetectors and instructions for calculating a velocity for each particle in the sample based on the photodetector signal pulses in two or more of the plurality of photodetector channels. In some instances, the plurality of lasers are configured to irradiate the flow stream at positions that are spaced apart from each other by 200 μm, such as 150 μm, such as 120 μm or less, such as 100 μm or less, such as 50 μm or less 10 μm or less, and in some instances ranging from 1 to 200 μm, such as 10 to 150 μm. In certain instances, the plurality of lasers includes a first laser configured to irradiate the flow stream in a first interrogation region, a second laser configured to irradiate the flow stream at a position downstream from the first laser, a third laser configured to irradiate the flow stream at a position downstream from the second laser and a fourth laser configured to irradiate the flow stream at a position downstream from the third laser. In some embodiments, the memory includes instructions which when executed by the processor to calculate timing of irradiation of the flow stream by each of the plurality of lasers. In some instances, the memory includes instructions to calculate the velocity for each particle in the flow stream based on the photodetector signal pulses in three or more of the photodetector channels.

Aspects of the present disclosure also include integrated circuits for determining drop delay of a plurality of irradiated particles in a sample in a flow stream. Integrated circuits according to certain embodiments include programming for calculating a velocity for each particle in the sample in the flow stream based on light detected from the irradiated particle in a first photodetector channel and light detected in a second photodetector channel and programming for determining the drop delay of each particle based on the calculated velocity. In some embodiments, the integrated circuit is a field programmable gate array (FPGA). In some embodiments, the integrated circuit is an application specific integrated circuit (ASIC). In some embodiments, the integrated circuit is a complex programmable logic device (CPLD).

In some embodiments, the integrated circuit includes programming for determining an amount of time between a signal pulse from the first photodetector and a signal pulse from the second photodetector. In some instances, the integrated circuit includes programming for determining a time-to-peak between the first photodetector signal pulse and the second photodetector signal pulse. In some instances, the integrated circuit includes programming for determining the first order moment of the first photodetector signal pulse and the second photodetector signal pulse. In some embodiments, the integrated circuit includes programming for calculating the velocity for each particle in the flow stream based on the amount of time between the first photodetector signal pulse and the second photodetector signal pulse. In some embodiments, the integrated circuit includes programming for calculating the drop delay of each particle by multiplying the calculated velocity for each particle in the flow stream by the distance between an interrogation region of the flow stream and an orifice of a flow cell nozzle configured to generate a droplet containing the particle.

In certain embodiments, the integrated circuit includes programming for adjusting the drop delay for each particle based on one or more of the calculated velocity for each particle in the flow stream and the calculated drop delay. In some instances, the integrated circuit includes programming for adjusting one or more parameters of the particle analyzer based on one or more of the calculated velocity for each particle in the flow stream and the calculated drop delay. In some instances, the integrated circuit includes programming for increasing the flow rate of the flow stream based on one or more of the calculated velocity for each particle in the flow stream and the calculated drop delay. In other instances, the integrated circuit includes programming for decreasing the flow rate of the flow stream based on one or more of the calculated velocity for each particle in the flow stream and the calculated drop delay. In other instances, the integrated circuit includes programming for adjusting the timing of droplet charging based on one or more of the calculated velocity for each particle in the flow stream and the calculated drop delay.

Aspects of the disclosure also include a non-transitory computer readable storage medium for determining drop delay of a plurality of irradiated particles in a sample in a flow stream. The non-transitory computer readable storage medium according to certain embodiments includes algorithm for irradiating a sample comprising the plurality of particles in the flow stream with a first laser in a first interrogation region and a second laser in a second interrogation region, algorithm for detecting light from each particle in a first photodetector channel and a second photodetector channel, algorithm for calculating a velocity for each particle in the flow stream based on the detected light in the first photodetector channel and the second photodetector channel and algorithm for determining the drop delay of each particle based on the calculated velocity.

In some embodiments, the non-transitory computer readable storage medium includes instructions having an algorithm for irradiating the flow stream with the second laser at a position downstream from the first laser. In some instances, the non-transitory computer readable storage medium includes algorithm for generating a first photodetector signal pulse in response to the light detected in the first photodetector channel and algorithm for generating a second photodetector signal pulse in response to the light detected in the second photodetector channel. In some instances, the instructions include algorithm for determining an amount of time between the first photodetector signal pulse and the second photodetector signal pulse. In some instances, the instructions include algorithm for determining a time-to-peak between the first photodetector signal pulse and the second photodetector signal pulse. In some instances, the instructions include algorithm for determining the first order moment of the first photodetector signal pulse and the second photodetector signal pulse. In some instances, the instructions include algorithm for calculating velocity for each particle in the flow stream based on the amount of time between the first photodetector signal pulse and the second photodetector signal pulse and a distance between the first laser and the second laser.

In some embodiments, the non-transitory computer readable storage medium is part of a particle analyzer having a flow cell with a flow cell nozzle for generating a droplet containing the particle and instructions include algorithm for calculating drop delay of each particle in the flow stream by multiplying the calculated velocity for each particle in the flow stream by the distance between the first interrogation region or second interrogation region and an orifice of the flow cell nozzle. In some instances, the instructions include algorithm for adjusting the drop delay of each particle based on one or more of the calculated velocity for each particle in the flow stream and the calculated drop delay. In some instances, the instructions include algorithm for adjusting one or more parameters of the particle analyzer based on one or more of the calculated velocity for each particle in the flow stream and the calculated drop delay. In certain instances, the instructions include algorithm for increasing the flow rate of the flow stream based on one or more of the calculated velocity for each particle in the flow stream and the calculated drop delay. In other instances, the instructions include algorithm for decreasing the flow rate of the flow stream based on one or more of the calculated velocity for each particle in the flow stream and the calculated drop delay. In other instances, the instructions include algorithm for adjusting the timing of droplet charging based on the calculated velocity for each particle in the flow stream. In other instances, the instructions include algorithm for irradiating the sample in the flow stream with a plurality of lasers, algorithm for detecting light from each particle in a plurality of photodetector channels, algorithm for generating a photodetector signal pulse in response to the detected light in each of the photodetector channels and algorithm for calculating a velocity for each particle in the flow stream based on the photodetector signal pulses in two or more of the photodetector channels. In certain instances, the non-transitory computer readable storage medium includes instructions with algorithm for calculating timing of irradiation of the flow stream by each of the lasers. In other instances, the non-transitory computer readable storage medium includes instructions with algorithm for calculating velocity for each particle in the flow stream based on the photodetector signal pulses in three or more of the photodetector channels.

BRIEF DESCRIPTION OF THE FIGURES

The invention may be best understood from the following detailed description when read in conjunction with the accompanying drawings. Included in the drawings are the following figures:

FIGS. 2A and 2B depict determining velocity of particles in a flow stream according to certain embodiments. FIG. 2A depicts the generation of signal pulses in response to irradiation of a particle using three spatially separated lasers. FIG. 2B depicts the calculation of velocity of a particle in a flow stream using signal pulses generated at three different positions along the flow stream.

FIG. 3 depicts a flow chart for determining drop delay of a plurality of particles in a sample in a flow stream according to certain embodiments.

DETAILED DESCRIPTION

Figure 1:
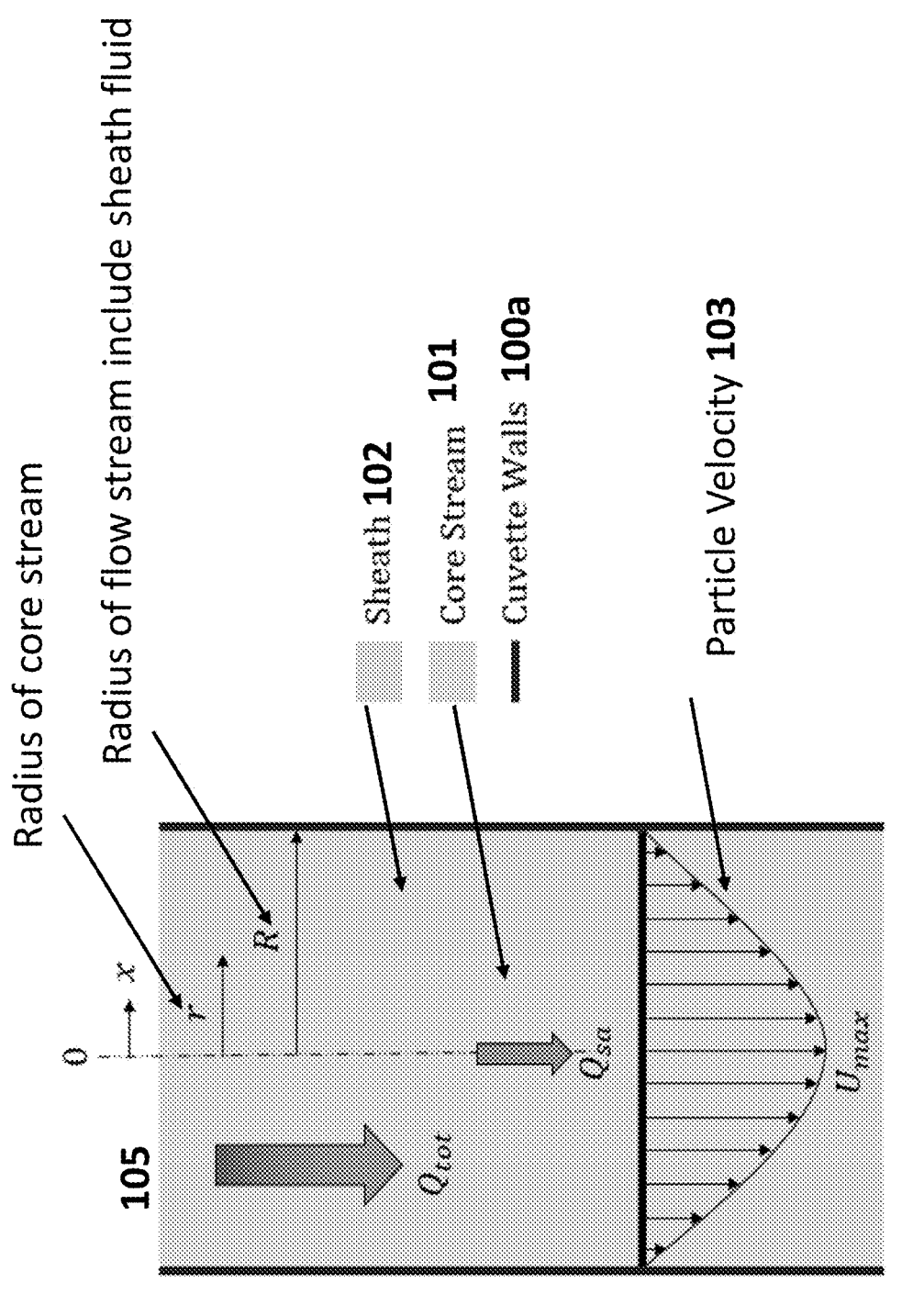
FIG. 1 depicts non-uniformity of particle velocity in a flow stream according to certain embodiments.

Aspects of the present disclosure include methods for determining drop delay for a plurality of particles in a flow stream (e.g., in a particle analyzer). Methods according to certain embodiments include irradiating a sample having a plurality of particles in the flow stream with two or more spatially separated lasers, detecting light from each particle in a first photodetector channel and a second photodetector channel calculating a velocity of each particle in the flow stream based on the detected light in the first photodetector channel and the second photodetector channel and determining the drop delay of each particle based on the calculated velocity.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides methods and systems for determining drop delay for a plurality of particles in a flow stream (e.g., a photodetector of a particle analyzer). In further describing embodiments of the disclosure, methods including detecting light from each particle in a first photodetector channel and a second photodetector channel, calculating a velocity of each particle in the flow stream in each photodetector channel and determining the drop delay of each particle based on the calculated velocity are first described in greater detail. Next, systems (e.g., particle analyzers) having a light source and a photodetector for practicing the subject methods are described. Non-transitory computer readable storage medium and integrated circuits having programming for determining a drop delay for each of the plurality of particles according to the subject methods are also provided.

Methods for Determining Drop Delay for a Plurality of Particles in a Flow Stream Aspects of the present disclosure include methods for determining drop delay for a plurality of particles in a flow stream, such as for example in a particle analyzer. Methods described herein provide for dynamic particle velocity determination for each individual particle in the flow stream. In certain instances, the subject methods provide for individually determining the velocity of every particle of interest in the irradiated sample. Methods described herein also provide for dynamic particle drop delay determination in real time and for determining a unique drop delay for each particle of interest in the sample. In certain instances, the subject methods provide for individually determining drop delay of every particle of interest in the irradiated sample. In certain embodiments, the subject methods provide for more precise and consistent particle sorting. In some embodiments, particle sorting parameters can be determined and adjusted, such as in real time, without any further user intervention. In embodiments, particle sorting in accordance with the subject disclosure exhibits greater overall particle sort yield.

Methods according to certain embodiments include irradiating a sample having a plurality of particles in the flow stream with two or more spatially separated lasers. In certain embodiments, particles in the flow stream are irradiated for one or more predetermined time intervals with a continuous wave light source. The term "continuous wave light source" is used herein in its conventional sense to refer to a source of light which provides uninterrupted light flux and maintains irradiation of particles in the flow stream with little to no undesired changes in light intensity. In some embodiments, the continuous light source emits non-pulsed or non-stroboscopic irradiation. In certain embodiments, the continuous light source provides for substantially constant emitted light intensity. For instance, the continuous light source may provide for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less. The intensity of light output can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In some embodiments, the particles in the flow stream are irradiated for one or more predetermined time intervals with a pulsed light source. The term "pulsed light source" is used herein in its conventional sense to refer to a source of light which emits light at predetermined time intervals, each time interval having a predetermined irradiation duration (i.e., pulse width). In certain embodiments, the pulsed light source is configured to irradiate the photodetector with periodic flashes of light. For example, the frequency of each light pulse may be 0.0001 kHz or greater, such as 0.0005 kHz or greater, such as 0.001 kHz or greater, such as 0.005 kHz or greater, such as 0.01 kHz or greater, such as 0.05 kHz or greater, such as 0.1 kHz or greater, such as 0.5 kHz or greater, such as 1 kHz or greater, such as 2.5 kHz or greater, such as 5 kHz or greater, such as 10 kHz or greater, such as 25 kHz or greater, such as 50 kHz or greater and including 100 kHz or greater. In certain instances, the frequency of pulsed irradiation by the light source ranges from 0.00001 kHz to 1000 kHz, such as from 0.00005 kHz to 900 kHz, such as from 0.0001 kHz to 800 kHz, such as from 0.0005 kHz to 700 kHz, such as from 0.001 kHz to 600 kHz, such as from 0.005 kHz to 500 kHz, such as from 0.01 kHz to 400 kHz, such as from 0.05 kHz to 300 kHz, such as from 0.1 kHz to 200 kHz and including from 1 kHz to 100 kHz. The duration of light irradiation for each light pulse (i.e., pulse width) may vary and may be 0.000001 ms or more, such as 0.000005 ms or more, such as 0.00001 ms or more, such as 0.00005 ms or more, such as 0.0001 ms or more, such as 0.0005 ms or more, such as 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 10 ms or more, such as 25 ms or more, such as 50 ms or more, such as 100 ms or more and including 500 ms or more. For example, the duration of light irradiation may range from 0.000001 ms to 1000 ms, such as from 0.000005 ms to 950 ms, such as from 0.00001 ms to 900 ms, such as from 0.00005 ms to 850 ms, such as from 0.0001 ms to 800 ms, such as from 0.0005 ms to 750 ms, such as from 0.001 ms to 700 ms, such as from 0.005 ms to 650 ms, such as from 0.01 ms to 600 ms, such as from 0.05 ms to 550 ms, such as from 0.1 ms to 500 ms, such as from 0.5 ms to 450 ms, such as from 1 ms to 400 ms, such as from 5 ms to 350 ms and including from 10 ms to 300 ms.

In embodiments, the light source may be any convenient light source and may include laser and non-laser light sources. In certain embodiments, the light source is a non-laser light source, such as a narrow band light source emitting a particular wavelength or a narrow range of wavelengths. In some instances, the narrow band light sources emit light having a narrow range of wavelengths, such as for example, 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Any convenient narrow band light source protocol may be employed, such as a narrow wavelength LED.

In other embodiments, the light source is a broadband light source, such as a broadband light source coupled to one or more optical bandpass filters, diffraction gratings, monochromators or any combination thereof. In some instances, the broadband light source emits light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Any convenient broadband light source protocol may be employed, such as a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof. In certain embodiments, light sources include an array of LEDs. In certain instances, the light source includes a plurality of monochromatic light emitting diodes where each monochromatic light emitting diode outputs light having a different wavelength. In some instances, the light source includes a plurality of polychromatic light emitting diodes outputting light having a predetermined spectral width, such as where the plurality of polychromatic light emitting diodes collectively output light having a spectral width that ranges from 200 nm to 1500 nm, such as from 225 nm to 1475 nm, such as from 250 nm to 1450 nm, such as from 275 nm to 1425 nm, such as from 300 nm to 1400 nm, such as from 325 nm to 1375 nm, such as from 350 nm to 1350 nm, such as from 375 nm to 1325 nm, such as from 400 nm to 1300 nm, such as from 425 nm to 1275 nm, such as from 450 nm to 1250 nm, such as from 475 nm to 1225 nm and including from 500 nm to 1200 nm.

In certain embodiments, the light source is a laser, such as a pulsed or continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

In some embodiments, the light source is a narrow bandwidth light source. In some instance, the light source is a light source that outputs a specific wavelength from 200 nm to 1500 nm, such as from 250 nm to 1250 nm, such as from 300 nm to 1000 nm, such as from 350 nm to 900 nm and including from 400 nm to 800 nm. In certain embodiments, the continuous wave light source emits light having a wavelength of 365 nm, 385 nm, 405 nm, 460 nm, 490 nm, 525 nm, 550 nm, 580 nm, 635 nm, 660 nm, 740 nm, 770 nm or 850 nm.

In some embodiments, the light source emits light having wavelengths that overlap, such as where the output spectrum of one or more components of the lights source overlap by 1 nm or more, such as by 2 nm or more, such as by 3 nm or more, such as by 4 nm or more, such as by 5 nm or more, such as by 6 nm or more, such as by 7 nm or more, such as by 8 nm or more, such as by 9 nm or more, such as by 10 nm or more and including by 20 nm or more. In some embodiments, the wavelengths of light emitted by the light sources exhibit no overlap. For example, the output spectrum of the light sources may be separated by 1 nm or more, such as by 2 nm or more, such as by 3 nm or more, such as by 4 nm or more, such as by 5 nm or more, such as by 6 nm or more, such as by 7 nm or more, such as by 8 nm or more, such as by 9 nm or more, such as by 10 nm or more and including by 20 nm or more.

In embodiments, particles in the flow stream are irradiated with 2 or more spatially separated light sources, such as 3 or more, such as 4 or more, such as 5 or more, such as 6 or more and including 7 or more spatially separated light sources. In some embodiments, one or more light sources are lasers and particles in the flow stream are irradiated with one or more spatially separated lasers, such as 2 or more, such as 3 or more, such as 4 or more, such as 5 or more, such as 6 or more and including 7 or more spatially separate laser. As described in greater detail below, each light source is configured to irradiate distinct positions on the flow stream. In some instances, each of the light sources is configured to independently irradiate positions on the flow stream that are spaced apart from each other by 0.01 μm or more, such as by 0.05 μm or more, such as by 0.1 μm or more, such as by 0.5 μm or more, such as by 1 μm or more, such as by 2 μm or more, such as by 3 μm or more, such as by 4 μm or more, such as by 5 μm or more, such as by 10 μm or more, such as by 15 μm or more, such as by 25 μm or more, such as by 50 μm or more and including by 100 μm or more. For example, each of the light sources is configured to independently irradiate positions on the flow stream that are spaced apart from each other by a distance of from 0.01 μm to 500 μm, such as from 0.05 μm to 450 μm, such as from 0.1 μm to 400 μm, such as from 0.5 μm to 350 μm, such as from 1 μm to 200 μm, such as from 5 μm to 150 μm and including from 10 μm to 100 μm. In certain instances, each of the light sources is configured to independently irradiate positions on the flow stream that are spaced apart from each other by 10 μm or less, such as 9 μm or less, such as 8 μm or less, such as 7 μm or less, such as 6 μm or less and including positions on the flow stream that are spaced apart by 5 μm or less.

In some embodiments, methods include irradiating particles in the flow stream with a first laser in a first interrogation region and a second laser in a second interrogation region. The size of each interrogation region may vary depending on the properties of the flow nozzle used to generate the flow stream, such as the size of the nozzle orifice and sample injection port size (as described in greater detail below). In embodiments, the interrogation region may have a width that is 0.01 mm or more, such as 0.05 mm or more, such as 0.1 mm or more, such as 0.5 mm or more, such as 1 mm or more, such as 2 mm or more, such as 3 mm or more, such as 5 mm or more and including 10 mm or more. The length of the interrogation region may also vary, ranging in some instances along 0.01 mm or more, such as 0.1 mm or more, such as 0.5 mm or more, such as 1 mm or more, such as 1.5 mm or more, such as 2 mm or more, such as 3 mm or more, such as 5 mm or more, such as 10 or more, such as 15 mm or more, such as 20 mm or more, such as 25 mm or more and including 50 mm or more.

The flow stream may be irradiated by each light source from any suitable distance, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, irradiation of the flow stream may be at any suitable angle such as at an angle ranging from 10° to 90°, such as from 15° to 85°, such as from 20° to 80°, such as from 25° to 75° and including from 30° to 60°, for example at a 90° angle.

In practicing the subject methods, light from each particle is detected by a light detection system. In embodiments, light detection systems include one or more photodetectors, such as 2 or more, such as 3 or more, such as 4 or more, such as 5 or more, such as 6 or more, such as 7 or more, such as 8 or more, such as 9 or more and including 10 or more photodetectors. Photodetectors for practicing the subject methods may be any convenient light detecting protocol, including but not limited to photosensors or photodetectors, such as active-pixel sensors (APSs), quadrant photodiodes, image sensors, charge-coupled devices (CODs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Light may be measured by the photodetector at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light from particles in the flow stream at 400 or more different wavelengths. Light may be measured continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the light from the light source may be taken one or more times during each discrete time interval, such as 2 or more times, such as 3 or more times, such as 5 or more times and including 10 or more times. In certain embodiments, the light from the light source is measured by the photodetector 2 or more times, with the data in certain instances being averaged.

In some embodiments, light detected from each particle in the sample is transmitted light, such as light detected with a brightfield light detector. In other embodiments, light detected from each particle in the sample is emitted light, such as particle luminescence (i.e., fluorescence or phosphorescence). In these embodiments, each particle may include one or more fluorophores which emits fluorescence in response to irradiation by the two or more light sources. For example, each particle may include 2 or more fluorophores, such as 3 or more, such as 4 or more, such as 5 or more, such as 6 or more, such as 7 or more, such as 8 or more, such as 9 or more and including 10 or more fluorophores. In some instances, each particle includes a first fluorophore which emits fluorescence in response to irradiation by a first laser and a second fluorophore which emits fluorescence in response to irradiation by a second laser. In some embodiments, fluorophores of interest may include but are not limited to dyes suitable for use in analytical applications (e.g., flow cytometry, imaging, etc.), such as an acridine dye, anthraquinone dyes, arylmethane dyes, diarylmethane dyes (e.g., diphenyl methane dyes), chlorophyll containing dyes, triarylmethane dyes (e.g., triphenylmethane dyes), azo dyes, diazonium dyes, nitro dyes, nitroso dyes, phthalocyanine dyes, cyanine dyes, asymmetric cyanine dyes, quinon-imine dyes, azine dyes, eurhodin dyes, safranin dyes, indamins, indophenol dyes, fluorine dyes, oxazine dye, oxazone dyes, thiazine dyes, thiazole dyes, xanthene dyes, fluorene dyes, pyronin dyes, fluorine dyes, rhodamine dyes, phenanthridine dyes, as well as dyes combining two or more of the aforementioned dyes (e.g., in tandem), polymeric dyes having one or more monomeric dye units and mixtures of two or more of the aforementioned dyes thereof. A large number of dyes are commercially available from a variety of sources, such as, for example, Molecular Probes (Eugene, Oreg.), Dyomics GmbH (Jena, Germany), Sigma-Aldrich (St. Louis, Mo.), Sirigen, Inc. (Santa Barbara, Calif.) and Exciton (Dayton, Ohio). For example, the fluorophore may include 4-acetamido-4'-isothiocyanatostilbene-2,2'disulfonic acid; acridine and derivatives such as acridine, acridine orange, acridine yellow, acridine red, and acridine isothiocyanate; allophycocyanin, phycoerythrin, peridinin-chlorophyll protein, 5-(2'-aminoethyl)aminonaphthalene-1-sulfonic acid (EDANS); 4-amino-N-[3-vinylsulfonyl)phenyl] naphthalimide-3,5 disulfonate (Lucifer Yellow VS); N-(4-anilino-1-naphthyl)maleimide; anthranilamide; Brilliant Yellow; coumarin and derivatives such as coumarin, 7-amino-4-methylcoumarin (AMC, Coumarin 120), 7-amino-4-trifluoromethylcouluarin (Coumaran 151); cyanine and derivatives such as cyanosine, Cy3, Cy3.5, Cy5, Cy5.5, and Cy7; 4',6-diaminidino-2-phenylindole (DAPI); 5', 5"-dibromopyrogallol-sulfonephthalein (Bromopyrogallol Red); 7-diethylamino-3-(4'-isothiocyanatophenyl)-4-methylcoumarin; diethylaminocoumarin; diethylenetriamine pentaacetate; 4,4'-diisothiocyanatodihydro-stilbene-2,2'-disulfonic acid; 4,4'-diisothiocyanatostilbene-2,2'-disulfonic acid; 5-[dimethylamino]naphthalene-1-sulfonyl chloride (DNS, dansyl chloride); 4-(4'-dimethylaminophenylazo)benzoic acid (DABCYL); 4-dimethylaminophenylazophenyl-4'-isothiocyanate (DABITC); eosin and derivatives such as eosin and eosin isothiocyanate; erythrosin and derivatives such as erythrosin B and erythrosin isothiocyanate; ethidium; fluorescein and derivatives such as 5-carboxyfluorescein (FAM), 5-(4,6-dichlorotriazin-2-yl) aminofluorescein (DTAF), 2'7'-dimethoxy-4'5'-dichloro-6-carboxyfluorescein (JOE), fluorescein isothiocyanate (FITC), fluorescein chlorotriazinyl, naphthofluorescein, and QFITC (XRITC); fluorescamine; IR144; IR1446; Green Fluorescent Protein (GFP); Reef Coral Fluorescent Protein (RCFP); Lissamine™; Lissamine rhodamine, Lucifer yellow; Malachite Green isothiocyanate; 4-methylumbelliferone; ortho cresolphthalein; nitrotyrosine; pararosaniline; Nile Red; Oregon Green; Phenol Red; B-phycoerythrin; o-phthaldialdehyde; pyrene and derivatives such as pyrene, pyrene butyrate and succinimidyl 1-pyrene butyrate; Reactive Red 4 (Cibacron™ Brilliant Red 3B-A); rhodamine and derivatives such as 6-carboxy-X-rhodamine (ROX), 6-carboxyrhodamine (R6G), 4,7-dichlororhodamine lissamine, rhodamine B sulfonyl chloride, rhodamine (Rhod), rhodamine B, rhodamine 123, rhodamine X isothiocyanate, sulforhodamine B, sulforhodamine 101, sulfonyl chloride derivative of sulforhodamine 101 (Texas Red), N,N,N',N'-tetramethyl-6-carboxyrhodamine (TAMRA), tetramethyl rhodamine, and tetramethyl rhodamine isothiocyanate (TRITC); riboflavin; rosolic acid and terbium chelate derivatives; xanthene; dye-conjugated polymers (i.e., polymer-attached dyes) such as fluorescein isothiocyanate-dextran as well as dyes combining two or more dyes (e.g., in tandem), polymeric dyes having one or more monomeric dye units and mixtures of two or more of the aforementioned dyes or combinations thereof.

In some instances, the fluorophore (i.e., dye) is a fluorescent polymeric dye. Fluorescent polymeric dyes that find use in the subject methods and systems are varied. In some instances of the method, the polymeric dye includes a conjugated polymer. Conjugated polymers (CPs) are characterized by a delocalized electronic structure which includes a backbone of alternating unsaturated bonds (e.g., double and/or triple bonds) and saturated (e.g., single bonds) bonds, where π-electrons can move from one bond to the other. As such, the conjugated backbone may impart an extended linear structure on the polymeric dye, with limited bond angles between repeat units of the polymer. For example, proteins and nucleic acids, although also polymeric, in some cases do not form extended-rod structures but rather fold into higher-order three-dimensional shapes. In addition, CPs may form "rigid-rod" polymer backbones and experience a limited twist (e.g., torsion) angle between monomer repeat units along the polymer backbone chain. In some instances, the polymeric dye includes a CP that has a rigid rod structure. As summarized above, the structural characteristics of the polymeric dyes can have an effect on the fluorescence properties of the molecules.

Any convenient polymeric dye may be utilized in the subject methods and systems. In some instances, a polymeric dye is a multichromophore that has a structure capable of harvesting light to amplify the fluorescent output of a fluorophore. In some instances, the polymeric dye is capable of harvesting light and efficiently converting it to emitted light at a longer wavelength. In some cases, the polymeric dye has a light-harvesting multichromophore system that can efficiently transfer energy to nearby luminescent species (e.g., a "signaling chromophore"). Mechanisms for energy transfer include, for example, resonant energy transfer (e.g., Forster (or fluorescence) resonance energy transfer, FRET), quantum charge exchange (Dexter energy transfer) and the like. In some instances, these energy transfer mechanisms are relatively short range; that is, close proximity of the light harvesting multichromophore system to the signaling chromophore provides for efficient energy transfer. Under conditions for efficient energy transfer, amplification of the emission from the signaling chromophore occurs when the number of individual chromophores in the light harvesting multichromophore system is large; that is, the emission from the signaling chromophore is more intense when the incident light (the "excitation light") is at a wavelength which is absorbed by the light harvesting multichromophore system than when the signaling chromophore is directly excited by the pump light.

The multichromophore may be a conjugated polymer. Conjugated polymers (CPs) are characterized by a delocalized electronic structure and can be used as highly responsive optical reporters for chemical and biological targets. Because the effective conjugation length is substantially shorter than the length of the polymer chain, the backbone contains a large number of conjugated segments in close proximity. Thus, conjugated polymers are efficient for light harvesting and enable optical amplification via energy transfer.

In some instances, the polymer may be used as a direct fluorescent reporter, for example fluorescent polymers having high extinction coefficients, high brightness, etc. In some instances, the polymer may be used as a strong chromophore where the color or optical density is used as an indicator.

Polymeric dyes of interest include, but are not limited to, those dyes described by Gaylord et al. in US Publication Nos. 20040142344, 20080293164, 20080064042, 20100136702, 20110256549, 20120028828, 20120252986, 20130190193 and 20160025735 the disclosures of which are herein incorporated by reference in their entirety; and Gaylord et al., J. Am. Chem. Soc., 2001, 123 (26), pp 6417-6418; Feng et al., Chem. Soc. Rev., 2010, 39, 2411-2419; and Traina et al., J. Am. Chem. Soc., 2011, 133 (32), pp 12600-12607, the disclosures of which are herein incorporated by reference in their entirety.

In certain embodiments, light detected from the sample is scattered light. The term "scattered light" is used herein in its conventional sense to refer to the propagation of light energy from particles in the sample (e.g., flowing in a flow stream) that are deflected from the incident beam path, such as by reflection, refraction or deflection of the beam of light. In certain instances, scattered light detected from the particles in the flow stream is forward scattered light (FSC). In other instances, scattered light detected from the particles in the flow stream is side scattered light. In yet other instances, scattered light detected from the particles in the flow stream is back-scattered light.

Light from the flow stream is detected in two or more photodetector channels, such as 3 or more, such as 4 or more, such as 5 or more, such as 6 or more, such as 7 or more, such as 8 or more, such as 9 or more and including 10 or more photodetector channels. In some embodiments, light is detected in a different photodetector for each light source (e.g., each laser) used to irradiate the flow stream. For instance, where the particles in the flow stream is irradiated by a first laser and a second laser, light each particle in the flow stream irradiated by the first laser may be detected in a first photodetector channel and light from each particle in the flow stream irradiated by the second laser may be detected in a second photodetector channel. In certain embodiments, scattered light from each particle in the flow stream irradiated by the first laser is detected in a first photodetector channel and scattered light from each particle in the flow stream irradiated by the second laser is detected in a second photodetector channel.

In embodiments, one or more signal pulses are generated in each photodetector channel in response to detected light. In some embodiments, a plurality of signal pulses are generated in each photodetector channel in response to the detected light, such as 2 or more signal pulses, such as 3 or more signal pulses, such as 4 or more signal pulses, such as 5 or more signal pulses, such as 6 or more signal pulses, such as 7 or more signal pulses, such as 8 or more signal pulses, such as 9 or more signal pulses and including generating 10 or more signal pulses in each photodetector channel in response to detected light. In some embodiments, one or more signal pulses is generated in a different photodetector channel in response to light detected from particles irradiated by each light source (e.g., each laser). For instance, where the particles in the flow stream is irradiated by a first laser and a second laser, a signal pulse may be generated in a first photodetector channel in response to light detected from each particle that is irradiated by the first laser and a signal pulse may be generated in a second photodetector channel in response to light detected from each particle that is irradiated by the second laser.

In some embodiments, the signal pulse is a voltage pulse. The voltage pulse may be a pulse of 0.001 mV or more, such as by 0.005 mV or more, such as by 0.01 mV or more, such as by 0.05 mV or more, such as by 0.1 mV or more, such as by 0.5 mV or more, such as by 1 mV or more, such as by 5 mV or more, such as by 10 mV or more, such as by 25 mV or more, such as by 50 mV or more, such as by 100 mV or more, such as by 250 mV or more, such as by 500 mV or more, such as by 1000 mV or more, such as by 2500 mV or more and including by 5000 mV or more. In some embodiments, a signal pulse is generated in each photodetector channel when the detected light generates a voltage which exceeds a predetermined threshold of 0.00001 mV or more, such as 0.00005 mV or more, such as 0.0001 mV or more, such as 0.0005 mV or more, such as 0.001 mV or more, such as 0.005 mV or more, such as 0.01 mV or more, such as 0.05 mV or more, such as 0.1 mV or more, such as 0.5 mV or more, such as 1 mV or more, such as 5 mV or more, such as 10 mV or more, such as 25 mV or more, such as 50 mV or more, such as 100 mV or more, such as 250 mV or more, such as 500 mV or more, such as 1000 mV or more, such as 2500 mV or more and including a predetermined threshold of 5000 mV or more.

In some embodiments, methods include determining an amount of time between photodetector signal pulses. In some instances, methods include determining the amount of time between signal pulses in two or more different photodetector channels, such as 3 or more different photodetector channels, such as 4 or more different photodetector channels, such as 5 or more different photodetector channels, such as 6 or more different photodetector channels, such as 7 or more different photodetector channels, such as 8 or more different photodetector channels, such as 9 or more different photodetector channels and including determining the amount of time between signal pulses in 10 or more different photodetector channels. In some instances, the time between signal pulses in the two or more different photodetector channels may be 0.00001 μs or more, such as 0.00005 μs or more, such as 0.0001 μs or more, such as 0.0005 μs or more, such as 0.001 μs or more, such as 0.005 μs, such as 0.01 μs or more, such as 0.05 μs or more, such as 0.1 μs or more, such as 0.5 μs or more, such as 1 μs or more, such as 5 μs or more, such as 10 μs or more, such as 25 μs or more, such as 50 μs or more, such as 100 μs or more, such as 500 μs or more and including 1000 μs or more. In certain instances, the time between signal pulses in the two or more different photodetector channels ranges from 0.00001 μs to 5000 μs, such as from 0.0001 μs to 4000 μs, such as from 0.001 μs to 3000 μs, such as from 0.01 μs to 2000 μs, such as from 0.1 μs to 1000 μs and including from 1 μs to 500 μs.

In some embodiments, methods include determining a time-to-peak duration between photodetector signal pulses. The term "time-to-peak" is used herein in its conventional sense to refer to the duration between the peak (e.g., value of highest detected voltage in the photodetector channel during a signal pulse) of the generated signal pulse in each photodetector channel. For example, the time-to-peak duration may be determined between signal pulses in two or more different photodetector channels, such as 3 or more different photodetector channels, such as 4 or more different photodetector channels, such as 5 or more different photodetector channels, such as 6 or more different photodetector channels, such as 7 or more different photodetector channels, such as 8 or more different photodetector channels, such as 9 or more different photodetector channels and including determining the time-to-peak duration between signal pulses in 10 or more different photodetector channels. In some instances, the time-to-peak duration between signal pulses in the two or more different photodetector channels may be 0.00001 μs or more, such as 0.00005 μs or more, such as 0.0001 μs or more, such as 0.0005 μs or more, such as 0.001 μs or more, such as 0.005 μs, such as 0.01 μs or more, such as 0.05 μs or more, such as 0.1 μs or more, such as 0.5 μs or more, such as 1 μs or more, such as 5 μs or more, such as 10 μs or more, such as 25 μs or more, such as 50 μs or more, such as 100 μs or more, such as 500 μs or more and including 1000 μs or more. In certain instances, the time-to-peak duration between signal pulses in the two or more different photodetector channels ranges from 0.00001 μs to 5000 μs, such as from 0.0001 μs to 4000 μs, such as from 0.001 μs to 3000 μs, such as from 0.01 μs to 2000 μs, such as from 0.1 μs to 1000 μs and including from 1 μs to 500 μs. In certain embodiments, methods include determining a first order moment of the signal pulses in each of the photodetector channels, such as a first order moment in the signal pulses in two or more photodetector channels, such as 3 or more photodetector channels, such as 4 or more photodetector channels, such as 5 or more photodetector channels, such as 6 or more photodetector channels, such as 7 or more photodetector channels, such as 8 or more photodetector channels, such as 9 or more photodetector channels and including determining a first order moment of the signal pulses in 10 or more of photodetector channels.

In some embodiments, particles in a flow stream are characterized by non-uniform velocities where the particles in the flow stream independently have different velocities. In some instances, the non-uniformity of the velocities of the particles is dependent on the position of the particle in the flow stream. In a flow stream having a core stream and a surrounding sheath flow, in certain instances, the velocity of particles flowing close to the center of the core stream is higher than the velocity of particles flowing along the periphery of the core stream. FIG. 1 depicts non-uniformity of particle velocity in a flow stream according to certain embodiments. In FIG. 1, flow stream 105 is formed in cuvette 100 and includes core stream 101 and a surrounding sheath fluid 102 contained in cuvette walls 100a. As shown in FIG. 1, particles flowing down the center of core stream 101 exhibit a higher particle flow velocity 103 as compared to particles flowing at the periphery of core stream 101 (i.e., at the interface between core stream 101 and sheath fluid 102).

In some embodiments, methods include calculating the velocity of each particle of interest in the flow stream. In some instances, the velocity of 1 or more particles in the sample is independently determined, such as the velocities of 2 or more particles in the sample, such as the velocities of 5 or more particles in the sample, such as the velocities of 10 or more particles in the sample, such as the velocities of 25 or more particles in the sample, such as the velocities of 50 or more particles in the sample, such as the velocities of 100 or more particles in the sample, such as the velocities of 250 or more particles in the sample and include independently calculating the velocities of 500 or more particles in the sample. For example, the velocities of 0.0001% or more of the particles in the sample may be independently calculated, such as 0.0005% or more, such as 0.001% or more, such as 0.005% or more, such as 0.01% or more, such as 0.05% or more, such as 0.1% or more, such as 0.5% or more, such as 1% or more, such as 5% or more, such as 10% or more, such as 25% or more, such as 50% or more, such as 75% or more and including independently calculating the velocities of 90% or more of the particles in the sample.

In some embodiments, the velocity for each particle is calculated based on the amount of time between a signal pulse in two or more photodetector channels and the distance between two or more interrogation regions. In one embodiment, the velocity for each particle is calculated based on the amount of time between a signal pulse from a first photodetector channel and a signal pulse from a second photodetector channel and the distance between the interrogation region of the first laser and the interrogation region of the second laser. In some instances, the distance between the first interrogation region and the second interrogation region is determined based on the distance between the position of irradiation by the first laser on the flow stream and the position of irradiation by the second laser on the flow stream. For example, depending on the particle analyzer in certain instances the distance between the first interrogation region and the second interrogation region is 0.01 μm or more, such as by 0.05 μm or more, such as by 0.1 μm or more, such as by 0.5 μm or more, such as by 1 μm or more, such as by 2 μm or more, such as by 3 μm or more, such as by 4 μm or more, such as by 5 μm or more, such as by 10 μm or more, such as by 15 μm or more, such as by 25 μm or more, such as by 50 μm or more and including by 100 μm or more. In other instances, the distance between the first interrogation region and the second interrogation region ranges from 0.01 μm to 500 μm, such as from 0.05 μm to 450 μm, such as from 0.1 μm to 400 μm, such as from 0.5 μm to 350 μm, such as from 1 μm to 200 μm, such as from 5 μm to 150 μm and including from 10 μm to 100 μm.

Figure 2A:
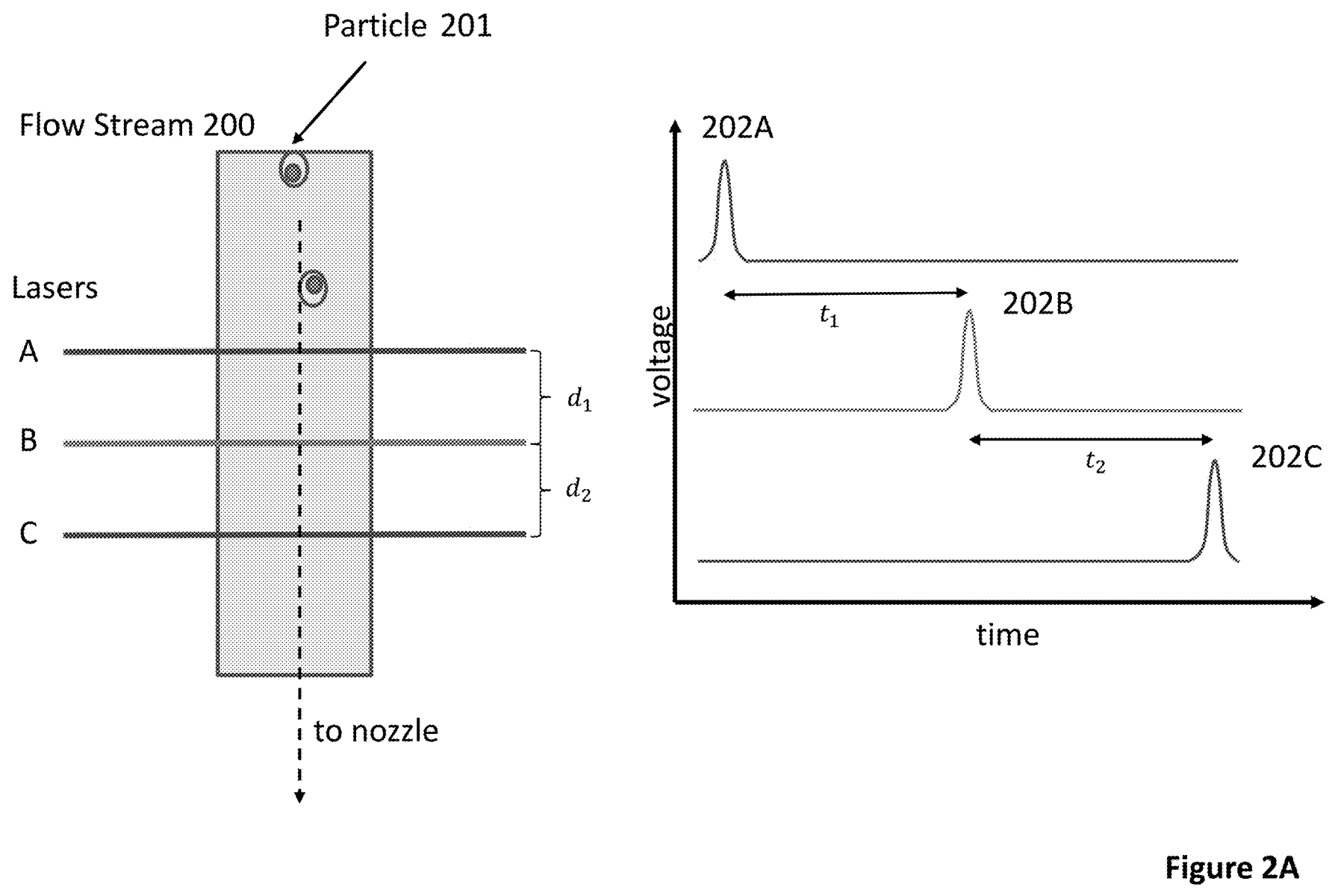
Figure 2B:
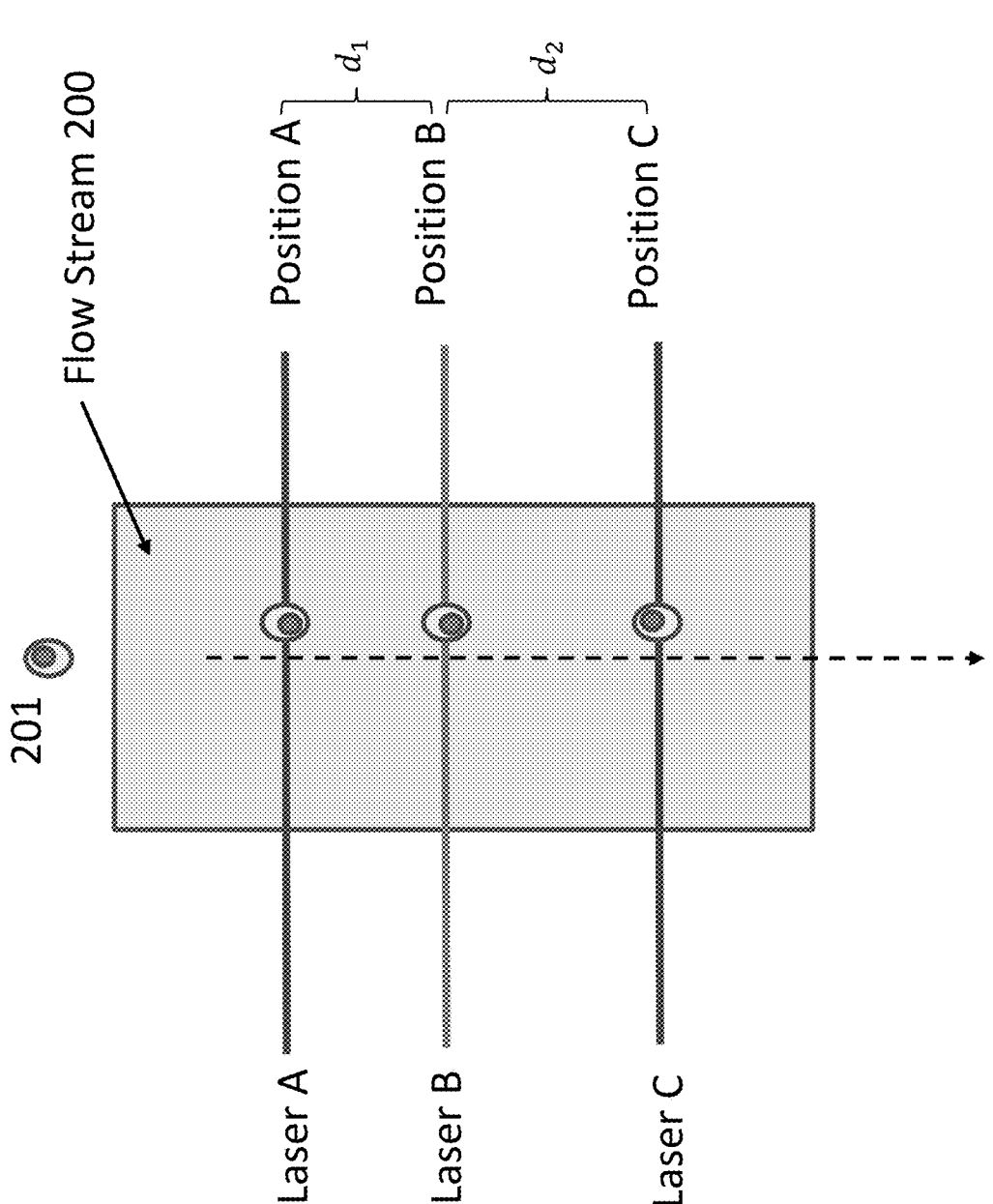

FIGS. 2A and 2B depict determining velocity of particles in a flow stream according to certain embodiments. FIG. 2A depicts the generation of signal pulses in response to irradiation of a particle using three spatially separated lasers. Particle 201 in flow stream 200 is irradiated by three spatially separated lasers (A, B, C). A signal pulse 202A is generated in a photodetector channel in response to light detected from irradiation of the particle by laser A. A second signal pulse 202B is generated in a photodetector channel in response to light detected from irradiation by laser B. The duration $t_1$ between signal pulses 202A and 202B is the amount of time for particle 201 to flow distance $d_1$ (i.e., from points of irradiation by laser A and laser B). A third signal pulse 202C is generated in a photodetector channel in response to light detected from irradiation by laser C. The duration $t_2$ between signal pulses 202B and 202C is the amount of time for particle 201 to flow distance $d_2$ (i.e., from points of irradiation by laser B and laser C). The velocity of particle 201 is estimated by dividing distance $d_1$ by time $t_1$ or by dividing the distance $d_2$ by time $t_2$.

FIG. 2B depicts determining velocity of particles in a flow stream according to certain embodiments. Laser A, Laser B and Laser C are spatially separated light sources configured to irradiate flow stream 200 at different positions where position B of flow stream 200 is downstream from position A. Position C of flow stream 200 is downstream from position A and position B. In one embodiment, the velocity of particle 201 is determined based on distance $d_1$ and the amount of time between the signal pulse generated in response to light irradiation of particle 201 at position A and the signal pulse generated in response to light irradiation of particle 201 at position B. In another embodiment, the velocity of particle 201 is determined based on distance $d_2$ and the amount of time between the signal pulse generated in response to light irradiation of particle 201 at position B and the signal pulse generated in response to light irradiation of particle 201 at position C.

In embodiments, the drop delay of each particle is determined based on the calculated velocity and the distance between an interrogation region of one or more of the light sources and the flow cell nozzle orifice. In some embodiments, the drop delay of each particle is independently determined by multiplying the calculated velocity of each particle of interest by the distance between an interrogation region of one or more of the light sources and the flow cell nozzle orifice. For example, depending on the particle analyzer in certain instances the distance between each interrogation region and the flow cell nozzle orifice is independently 0.01 μm or more, such as by 0.05 μm or more, such as by 0.1 μm or more, such as by 0.5 μm or more, such as by 1 μm or more, such as by 2 μm or more, such as by 3 μm or more, such as by 4 μm or more, such as by 5 μm or more, such as by 10 μm or more, such as by 15 μm or more, such as by 25 μm or more, such as by 50 μm or more and including by 100 μm or more. In other instances, the distance between each interrogation region and the flow cell nozzle orifice ranges from 0.01 μm to 500 μm, such as from 0.05 μm to 450 μm, such as from 0.1 μm to 400 μm, such as from 0.5 μm to 350 μm, such as from 1 μm to 200 μm, such as from 5 μm to 150 μm and including from 10 μm to 100 μm.

In some embodiments, methods include adjusting one or more parameters of the particle analyzer based on one or more of the calculated velocity for each particle in the flow stream and the calculated drop delay. In some instances, the flow rate of the flow stream is increased based on one or more of the calculated velocity for each particle in the flow stream and the calculated drop delay. In certain instances, the flow rate may be increased by 1% or more, such as by 5% or more, such as by 10% or more, such as by 15% or more, such as by 25% or more, such as by 50% or more, such as by 75% or more, such as by 90% or more, such as by 95% or more, such as by 97% or more, such as by 99% or more and including increasing the flow rate of the flow stream by 99.9% or more. In some embodiments, the flow rate of the flow stream is increased by 1 μL/sec or more, such as 2 μL/sec or more, such as 5 μL/sec or more, such as 10 μL/sec or more, such as 25 μL/sec or more, such as 50 μL/sec or more, such as 100 μL/sec or more, such as 250 μL/Usec or more, such as 500 μL/Usec or more, such as 750 μL/sec or more and including 1000 μL/sec or more. In other embodiments, the flow rate of the flow stream is increased by 0.001 mm/sec or more, such as by 0.005 mm/sec or more, such as by 0.01 mm/sec or more, such as by 0.05 mm/sec or more, such as by 0.1 mm/sec or more, such as by 0.5 mm/sec or more, such as by 1 mm/sec or more, such as by 5 mm/sec or more and including where the flow rate of the flow stream is increased by 10 mm/sec or more.

In other instances, the flow rate of the flow stream is decreased based on one or more of the calculated velocity for each particle in the flow stream and the calculated drop delay. In certain instances, the flow rate may be decreased by 1% or more, such as by 5% or more, such as by 10% or more, such as by 15% or more, such as by 25% or more, such as by 50% or more, such as by 75% or more, such as by 90% or more, such as by 95% or more, such as by 97% or more, such as by 99% or more and including decreasing the flow rate of the flow stream by 99.9% or more. In some embodiments, the flow rate of the flow stream is decreased by 1 μL/sec or more, such as 2 μL/sec or more, such as 5 μL/sec or more, such as 10 μL/sec or more, such as 25 μL/sec or more, such as 50 μL/sec or more, such as 100 μL/sec or more, such as 250 μL/sec or more, such as 500 μL/sec or more, such as 750 μL/sec or more and including 1000 μL/sec or more. In other embodiments, the flow rate of the flow stream is decreased by 0.001 mm/sec or more, such as by 0.005 mm/sec or more, such as by 0.01 mm/sec or more, such as by 0.05 mm/sec or more, such as by 0.1 mm/sec or more, such as by 0.5 mm/sec or more, such as by 1 mm/sec or more, such as by 5 mm/sec or more and including where the flow rate of the flow stream is decreasing by 10 mm/sec or more.

In some embodiments, methods include adjusting the timing of droplet charging based on one or more of the calculated velocity for each particle in the flow stream and the calculated drop delay. In some instances, the timing of droplet charging is adjusted to be delayed by 0.01% or more, such as by 0.05% or more, such as by 0.1% or more, such as by 0.5% or more, such as by 1% or more, such as by 2% or more, such as by 5% or more, such as by 10% or more, such as by 15% or more, such as by 25% or more and including by 50% or more. For example, the timing of droplet charging may be delayed by a 0.0001 μs or more in response to the calculated velocity for each particle in the flow stream and the calculated drop delay, such as by 0.0005 μs or more, such as by 0.001 μs or more, such as by 0.005 μs or more, such as by 0.01 μs or more, such as by 0.05 μs or more, such as by 0.1 μs or more, such as by 0.5 μs or more, such as by 1 μs or more, such as by 5 μs or more, such as by 10 μs or more, such as by 25 μs or more, such as by 50 μs or more, such as by 100 μs or more and including delaying droplet charging by 500 μs or more in response to the calculated velocity for each particle in the flow stream and the calculated drop delay. In other instances, the timing of droplet charging is adjusted to be earlier by 0.01% or more, such as by 0.05% or more, such as by 0.1% or more, such as by 0.5% or more, such as by 1% or more, such as by 2% or more, such as by 5% or more, such as by 10% or more, such as by 15% or more, such as by 25% or more and including by 50% or more. For example, the timing of droplet charging may be adjusted to be earlier by 0.0001 μs or more in response to the calculated velocity for each particle in the flow stream and the calculated drop delay, such as by 0.0005 μs or more, such as by 0.001 μs or more, such as by 0.005 μs or more, such as by 0.01 μs or more, such as by 0.05 μs or more, such as by 0.1 μs or more, such as by 0.5 μs or more, such as by 1 μs or more, such as by 5 μs or more, such as by 10 μs or more, such as by 25 μs or more, such as by 50 μs or more, such as by 100 μs or more and including by 500 μs or more.

In other embodiments, methods include adjusting the drop drive frequency based on one or more of the calculated velocity for each particle in the flow stream and the calculated drop delay. In some instances, the drop drive frequency is increased, such as by 0.01 Hz or more, such as by 0.05 Hz or more, such as by 0.1 Hz or more, such as by 0.25 Hz or more, such as by 0.5 Hz or more, such as by 1 Hz or more, such as by 2.5 Hz or more, such as by 5 Hz or more, such as by 10 Hz or more and including by 25 Hz or more. For example, the drop drive frequency may be increased by 1% or more, such as by 5% or more, such as by 10% or more, such as by 15% or more, such as by 25% or more, such as by 50% or more, such as by 75% or more and including increasing the drop drive frequency by 90% or more. In other instances, the drop drive frequency is reduced, such as by 0.01 Hz or more, such as by 0.05 Hz or more, such as by 0.1 Hz or more, such as by 0.25 Hz or more, such as by 0.5 Hz or more, such as by 1 Hz or more, such as by 2.5 Hz or more, such as by 5 Hz or more, such as by 10 Hz or more and including by 25 Hz or more. For example, the drop drive frequency may be reduced by 1% or more, such as by 5% or more, such as by 10% or more, such as by 15% or more, such as by 25% or more, such as by 50% or more, such as by 75% or more and including reducing the drop frequency by 90% or more.

In still other embodiments, methods include adjusting the drop delay based on one or more of the calculated velocity for each particle in the flow stream and the calculated drop delay. In some instances, the drop delay is increased, such as by 0.01 μs or more, such as by 0.05 μs or more, such as by 0.1 μs or more, such as by 0.3 μs or more, such as by 0.5 μs or more, such as by 1 μs or more, such as by 2.5 μs or more, such as by 5 μs or more, such as by 7.5 μs or more and including increasing the drop delay by 10 μs or more. For example, the drop delay may be increased by 1% or more, such as by 5% or more, such as by 10% or more, such as by 15% or more, such as by 25% or more, such as by 50% or more, such as by 75% or more and including increasing the drop delay by 90% or more. In other instances, the drop frequency is reduced, such as by 0.01 μs or more, such as by 0.05 μs or more, such as by 0.1 μs or more, such as by 0.3 μs or more, such as by 0.5 μs or more, such as by 1 μs or more, such as by 2.5 μs or more, such as by 5 μs or more, such as by 7.5 μs or more and including reducing the drop delay by 10 μs or more. For example, the drop delay may be reduced by 1% or more, such as by 5% or more, such as by 10% or more, such as by 15% or more, such as by 25% or more, such as by 50% or more, such as by 75% or more and including reducing the drop delay by 90% or more.

FIG. 3 depicts a flow chart for determining drop delay of a plurality of particles in a sample in a flow stream according to certain embodiments. At step 301, a particle in a flow stream is irradiated with a first laser. Light from the particle irradiated with the first laser is detected at step 302 and a signal pulse is generated in a first photodetector channel. At step 303, the particle is irradiated with a second laser that is spatially separated and downstream from the first laser. Light from the particle irradiated with the second laser is detected at step 304 and a signal pulse is generated in a second photodetector channel. At step 305, the velocity of the particle is estimated based on the distance between the irradiation points of the first laser and the second laser and the time between generated signal pulses in the first photodetector channel and the second photodetector channel. The drop delay of the particle is calculated based on the estimated velocity at step 306. In certain embodiments, one or more parameters of a particle analyzer is adjusted (step 307) using the estimated particle velocity or calculated drop delay, such as increasing or decreasing the drop delay, increasing or decreasing the flow stream flow rate, adjusting droplet charge timing and adjusting droplet drive frequency.

In certain embodiments, methods also include sorting particles of the sample. The term "sorting" is used herein in its conventional sense to refer to separating components (e.g., droplets containing cells, droplets containing non-cellular particles such as biological macromolecules) of a sample and in some instances, delivering the separated components to one or more sample collection containers. For example, methods may include sorting 2 or more components of the sample, such as 3 or more components, such as 4 or more components, such as 5 or more components, such as 10 or more components, such as 15 or more components and including sorting 25 or more components of the sample. In embodiments, methods including sorting cells based on the generated image mask of the cell.

In sorting the cell, methods include data acquisition (e.g., by determining velocity of each particle of interest in the sample, determining drop delay of each particle, etc.), analysis and recording, such as with a computer, where multiple data channels record data from each detector used in generating the image, image mask or masked image of the cell (e.g., scatter detectors, brightfield photodetectors or fluorescence detectors). In these embodiments, analysis includes classifying and counting particles such that each particle is present as a set of digitized parameter values. The subject systems (described below) may be set to trigger on a selected parameter in order to distinguish the particles of interest from background and noise.

A particular subpopulation of interest may then further analyzed by "gating" based on the data collected for the entire population. To select an appropriate gate, the data is plotted so as to obtain the best separation of subpopulations possible. This procedure may be performed by plotting forward light scatter (FSC) vs. side (i.e., orthogonal) light scatter (SSC) on a two-dimensional dot plot. A subpopulation of particles is then selected (i.e., those cells within the gate) and particles that are not within the gate are excluded. Where desired, the gate may be selected by drawing a line around the desired subpopulation using a cursor on a computer screen. Only those particles within the gate are then further analyzed by plotting the other parameters for these particles, such as fluorescence. Where desired, the above analysis may be configured to yield counts of the particles of interest in the sample.

In some embodiments, methods include sorting components of a sample, such as described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosures of which are herein incorporated by reference in their entirety. In some embodiments, methods for sorting components of sample include sorting particles (e.g., cells in a biological sample) with an enclosed particle sorting module, such as those described in U.S. Patent Publication No. 2017/0299493, the disclosure of which is incorporated herein by reference. In certain embodiments, particles (e.g., cells) of the sample are sorted using a sort decision module having a plurality of sort decision units, such as those described in U.S. Patent Publication No. 2020/0256781, the disclosure of which is incorporated herein by reference. In some embodiments, methods for sorting components of sample include sorting particles (e.g., cells in a biological sample) with a particle sorting module having deflector plates, such as described in U.S.

Patent Publication No. 2017/0299493, filed on Mar. 28, 2017, the disclosure of which is incorporated herein by reference.

Systems for Determining Drop Delay for a Plurality of Particles in a Flow Stream Aspects of the present disclosure also include systems having a light source and a light detection system for determining drop delay for a plurality of particles in a flow stream. In embodiments, systems include two or more spatially separated light sources that are configured to irradiate a plurality of particles in a flow stream. In some embodiments, the light source is a continuous wave light source, such as where the light source provides uninterrupted light flux and maintains irradiation of particles in the flow stream with little to no undesired changes in light intensity. In some embodiments, the continuous light source emits non-pulsed or non-stroboscopic irradiation. In certain embodiments, the continuous light source provides for substantially constant emitted light intensity. For instance, the continuous light source may provide for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less. The intensity of light output can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In some embodiments, the light source includes one or more pulsed light sources, such as where light is emitted at predetermined time intervals, each time interval having a predetermined irradiation duration (i.e., pulse width). In certain embodiments, the pulsed light source is configured to irradiate the photodetector with periodic flashes of light. For example, the frequency of each light pulse may be 0.0001 kHz or greater, such as 0.0005 kHz or greater, such as 0.001 kHz or greater, such as 0.005 kHz or greater, such as 0.01 kHz or greater, such as 0.05 kHz or greater, such as 0.1 kHz or greater, such as 0.5 kHz or greater, such as 1 kHz or greater, such as 2.5 kHz or greater, such as 5 kHz or greater, such as 10 kHz or greater, such as 25 kHz or greater, such as 50 kHz or greater and including 100 kHz or greater. In certain instances, the frequency of pulsed irradiation by the light source ranges from 0.00001 kHz to 1000 kHz, such as from 0.00005 kHz to 900 kHz, such as from 0.0001 kHz to 800 kHz, such as from 0.0005 kHz to 700 kHz, such as from 0.001 kHz to 600 kHz, such as from 0.005 kHz to 500 kHz, such as from 0.01 kHz to 400 kHz, such as from 0.05 kHz to 300 kHz, such as from 0.1 kHz to 200 kHz and including from 1 kHz to 100 kHz. The duration of light irradiation for each light pulse (i.e., pulse width) may vary and may be 0.000001 ms or more, such as 0.000005 ms or more, such as 0.00001 ms or more, such as 0.00005 ms or more, such as 0.0001 ms or more, such as 0.0005 ms or more, such as 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 10 ms or more, such as 25 ms or more, such as 50 ms or more, such as 100 ms or more and including 500 ms or more. For example, the duration of light irradiation may range from 0.000001 ms to 1000 ms, such as from 0.000005 ms to 950 ms, such as from 0.00001 ms to 900 ms, such as from 0.00005 ms to 850 ms, such as from 0.0001 ms to 800 ms, such as from 0.0005 ms to 750 ms, such as from 0.001 ms to 700 ms, such as from 0.005 ms to 650 ms, such as from 0.01 ms to 600 ms, such as from 0.05 ms to 550 ms, such as from 0.1 ms to 500 ms, such as from 0.5 ms to 450 ms, such as from 1 ms to 400 ms, such as from 5 ms to 350 ms and including from 10 ms to 300 ms.

In embodiments, systems may include any convenient light source and may include laser and non-laser light sources. In certain embodiments, the light source is a non-laser light source, such as a narrow band light source emitting a particular wavelength or a narrow range of wavelengths. In some instances, the narrow band light sources emit light having a narrow range of wavelengths, such as for example, 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Any convenient narrow band light source protocol may be employed, such as a narrow wavelength LED.

In other embodiments, the light source is a broadband light source, such as a broadband light source coupled to one or more optical bandpass filters, diffraction gratings, monochromators or any combination thereof. In some instances, the broadband light source emits light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Any convenient broadband light source protocol may be employed, such as a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof. In certain embodiments, light sources include an array of LEDs. In certain instances, the light source includes a plurality of monochromatic light emitting diodes where each monochromatic light emitting diode outputs light having a different wavelength. In some instances, the light source includes a plurality of polychromatic light emitting diodes outputting light having a predetermined spectral width, such as where the plurality of polychromatic light emitting diodes collectively output light having a spectral width that ranges from 200 nm to 1500 nm, such as from 225 nm to 1475 nm, such as from 250 nm to 1450 nm, such as from 275 nm to 1425 nm, such as from 300 nm to 1400 nm, such as from 325 nm to 1375 nm, such as from 350 nm to 1350 nm, such as from 375 nm to 1325 nm, such as from 400 nm to 1300 nm, such as from 425 nm to 1275 nm, such as from 450 nm to 1250 nm, such as from 475 nm to 1225 nm and including from 500 nm to 1200 nm.

In certain embodiments, the light source is a laser, such as a pulsed or continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

In some embodiments, the light source is a narrow bandwidth light source. In some instance, the light source is a light source that outputs a specific wavelength from 200 nm to 1500 nm, such as from 250 nm to 1250 nm, such as from 300 nm to 1000 nm, such as from 350 nm to 900 nm and including from 400 nm to 800 nm. In certain embodiments, the continuous wave light source emits light having a wavelength of 365 nm, 385 nm, 405 nm, 460 nm, 490 nm, 525 nm, 550 nm, 580 nm, 635 nm, 660 nm, 740 nm, 770 nm or 850 nm.

In some embodiments, the light source emits light having wavelengths that overlap, such as where the output spectrum of one or more components of the lights source overlap by 1 nm or more, such as by 2 nm or more, such as by 3 nm or more, such as by 4 nm or more, such as by 5 nm or more, such as by 6 nm or more, such as by 7 nm or more, such as by 8 nm or more, such as by 9 nm or more, such as by 10 nm or more and including by 20 nm or more. In some embodiments, the wavelengths of light emitted by the light sources exhibit no overlap. For example, the output spectrum of the light sources may be separated by 1 nm or more, such as by 2 nm or more, such as by 3 nm or more, such as by 4 nm or more, such as by 5 nm or more, such as by 6 nm or more, such as by 7 nm or more, such as by 8 nm or more, such as by 9 nm or more, such as by 10 nm or more and including by 20 nm or more.

In embodiments, light sources of the subject systems are spatially separated. In some embodiments, systems include 2 or more spatially separated light sources, such as 3 or more, such as 4 or more, such as 5 or more, such as 6 or more and including 7 or more spatially separated light sources. In some embodiments, one or more light sources are lasers, such as 2 or more spatially separated lasers, such as 3 or more, such as 4 or more, such as 5 or more, such as 6 or more and including 7 or more spatially separate lasers. Each light source is configured to irradiate a distinct position on the flow stream. In some instances, each of the light sources is configured to independently irradiate positions on the flow stream that are spaced apart from each other by 0.01 μm or more, such as by 0.05 μm or more, such as by 0.1 μm or more, such as by 0.5 μm or more, such as by 1 μm or more, such as by 2 μm or more, such as by 3 μm or more, such as by 4 μm or more, such as by 5 μm or more, such as by 10

µm or more, such as by 15 µm or more, such as by 25 µm or more, such as by 50 µm or more and including by 100 µm or more. For example, each of the light sources is configured to independently irradiate positions on the flow stream that are spaced apart from each other by a distance of from 0.01 µm to 500 µm, such as from 0.05 µm to 450 µm, such as from 0.1 µm to 400 µm, such as from 0.5 µm to 350 µm, such as from 1 µm to 200 µm, such as from 5 µm to 150 µm and including from 10 µm to 100 µm. In certain instances, each of the light sources is configured to independently irradiate positions on the flow stream that are spaced apart from each other by 10 µm or less, such as 9 µm or less, such as 8 µm or less, such as 7 µm or less, such as 6 µm or less and including positions on the flow stream that are spaced apart by 5 µm or less.

In some embodiments, systems include a first laser configured to irradiate a flow stream in a first interrogation region and a second laser in a second interrogation region. The size of each interrogation region may vary depending on the properties of the flow nozzle used to generate the flow stream, such as the size of the nozzle orifice and sample injection port size. In some embodiments, the interrogation region may have a width that is 0.01 mm or more, such as 0.05 mm or more, such as 0.1 mm or more, such as 0.5 mm or more, such as 1 mm or more, such as 2 mm or more, such as 3 mm or more, such as 5 mm or more and including 10 mm or more. The length of the interrogation region may also vary, ranging in some instances along 0.01 mm or more, such as 0.1 mm or more, such as 0.5 mm or more, such as 1 mm or more, such as 1.5 mm or more, such as 2 mm or more, such as 3 mm or more, such as 5 mm or more, such as 10 or more, such as 15 mm or more, such as 20 mm or more, such as 25 mm or more and including 50 mm or more.

Each interrogation region in certain instances may be configured to facilitate irradiation of a planar cross-section of an emanating flow stream or may be configured to facilitate irradiation of a diffuse field (e.g., with a diffuse laser or lamp) of a predetermined length. In some embodiments, the interrogation region of the flow stream in the subject systems includes a transparent window that facilitates irradiation of a predetermined length of an emanating flow stream, such as 1 mm or more, such as 2 mm or more, such as 3 mm or more, such as 4 mm or more, such as 5 mm or more and including 10 mm or more. Depending on the light source used to irradiate the emanating flow stream (as described below), the interrogation region may be configured to pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm.

Each light source may be positioned by any suitable distance from the flow stream, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, each light source may be positioned at any suitable angle relative to the flow stream such as at an angle ranging from 10° to 90°, such as from 15° to 85°, such as from 20° to 80°, such as from 25° to 75° and including from 30° to 60°, for example at a 90° angle.

Light sources according to certain embodiments may also include one or more optical adjustment components. The term "optical adjustment" is used herein in its conventional sense to refer to any device that is capable of changing the spatial width of irradiation or some other characteristic of irradiation from the light source, such as for example, irradiation direction, wavelength, beam width, beam intensity and focal spot. Optical adjustment protocols may be any convenient device which adjusts one or more characteristics of the light source, including but not limited to lenses, mirrors, filters, fiber optics, wavelength separators, pinholes, slits, collimating protocols and combinations thereof. In certain embodiments, systems of interest include one or more focusing lenses. The focusing lens, in one example may be a de-magnifying lens. In another example, the focusing lens is a magnifying lens. In other embodiments, systems of interest include one or more mirrors. In still other embodiments, systems of interest include fiber optics.

Where the optical adjustment component is configured to move, the optical adjustment component may be configured to be moved continuously or in discrete intervals. In some embodiments, movement of the optical adjustment component is continuous. In other embodiments, the optical adjustment component is movable in discrete intervals, such as for example in 0.01 micron or greater increments, such as 0.05 micron or greater, such as 0.1 micron or greater, such as 0.5 micron or greater, such as 1 micron or greater, such as 10 micron or greater, such as 100 microns or greater, such as 500 microns or greater, such as 1 mm or greater, such as 5 mm or greater, such as 10 mm or greater and including 25 mm or greater increments.

Any displacement protocol may be employed to move the optical adjustment component structures, such as coupled to a movable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

Photodetectors of the subject systems may be any convenient light detecting protocol, including but not limited to photosensors or photodetectors, such as active-pixel sensors (APSs), quadrant photodiodes, image sensors, charge-coupled devices (CODs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

In embodiments of the present disclosure, the photodetector may be configured to detect light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light at 400 or more different wavelengths.

In embodiments, photodetectors may be configured to measure light continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

The photodetectors may be configured to take measurements of the light from the light source one or more times during each discrete time interval, such as 2 or more times, such as 3 or more times, such as 5 or more times and including 10 or more times. In certain embodiments, the light from the light source is measured by the photodetector 2 or more times, with the data in certain instances being averaged.

In some embodiments, light detection systems are configured to detect emitted light from particles in the sample, such as particle luminescence (i.e., fluorescence or phosphorescence). In other embodiments, light detection systems are configured to detect transmitted light, such as where the light detection system includes a brightfield light detector.

In certain embodiments, light detection systems are configured to detect scattered light. In embodiments, scattered light according to the present disclosure is not fluorescence or phosphorescence. In some embodiments, scattered light detected by scatter photodetectors of the subject systems includes Mie scattering by particles in the flow stream. In other embodiments, scattered light detected by scatter photodetectors of the subject systems includes Rayleigh scattering by particles in the flow stream. In still other embodiments, scattered light detected by scatter photodetectors of the subject systems includes Mie scattering and Rayleigh scattering by particles in the flow stream. The scatter photodetectors may be side scatter photodetectors, forward scatter photodetectors, back scatter photodetectors and combinations thereof.

Light detection systems according to certain embodiments include an unfiltered light scatter detector. The term "unfiltered" is used herein to refer to a light scatter detector which receives light from a sample that has not been conveyed through an optical component that is configured to restrict, reduce or otherwise limit the propagation of one or more wavelengths of the light (e.g., the wavelengths of the light of the lasers used to irradiate the sample) from the sample to the active surface of the light scatter detector. For example, in some embodiments, unfiltered light scatter detectors of interest are not in optical communication with the sample through a bandpass filter. In other embodiments, unfiltered light scatter detectors of interest are not in optical communication with the sample through a dichroic mirror. In certain instances, scattered light from the sample is conveyed directly to the active surface of the unfiltered light scatter detector. In other instances, scattered light from the sample is conveyed to the active surface of the unfiltered light scatter detector through one or more light propagating optical components, such as optical components which change the direction or focus of the light beam without reducing, restricting or limiting the propagation of one or more wavelengths of the light. In certain embodiments, scattered light from the sample is conveyed to the active surface of the unfiltered light scatter detector using one or more beam splitters, mirrors, lenses or collimators.

In some embodiments, light detection systems include one or more filtered light scatter detectors. The term "filtered" is used herein to refer to a light scatter detector which receives light from a sample that has been conveyed through an optical component that is configured to restrict, reduce or limit the propagation of at least one or more wavelengths of the light (e.g., one or more of the wavelengths of the light of the lasers used to irradiate the sample) from the sample to the active surface of the light scatter detector. The light conveyed to the light scatter photodetector may include an optical component that limits the propagation of one or more different wavelengths of light, such as 5 or more, such as 10 or more, such as 25 or more, such as 50 or more, such as 100 or more, such as 200 or more, such as 300 or more and including limiting the propagation of 500 or more different wavelengths of light. For example, in some embodiments, scattered light from the sample is conveyed to the active surface of the filtered light scatter detector through a bandpass filter. In other embodiments, scattered light from the sample is conveyed to the active surface of the filtered light scatter detector through a dichroic mirror.

Scattered light may be detected by each photodetector at an angle with respect to the incident beam of light irradiation, such as at an angle of 1° or more, such as 10° or more, such as 15° or more, such as 20° or more, such as 25° or more, such as 30° or more, such as 45° or more, such as 60° or more, such as 75° or more, such as 90° or more, such as 135° or more, such as 150° or more and including where the scattered light detector is configured to detect light from particles in the sample at an angle that is 180° or more with respect to the incident beam of light irradiation. In certain instances, one or more of the filtered and unfiltered light scatter detectors is a side scatter photodetector, such as where the photodetector is positioned to detect scattered light that is propagated from 30° to 120° with respect to the incident beam of light irradiation, such as from 45° to 105° and including from 60° to 90°. In certain instances, one or more of the filtered and unfiltered light scatter detectors is a side scatter photodetector positioned at an angle of 90° with respect to the incident beam of light irradiation. In other instances, one or more of the filtered and unfiltered light scatter detector is a forward scatter detector, such as where the detector is positioned to detect scattered light that is propagated from 120° to 240° with respect to the incident beam of light irradiation, such as from 100° to 220°, such as from 120° to 200° and including from 140° to 180° with respect to the incident beam of light irradiation. In certain instances, one or more of the filtered and unfiltered light scatter detectors is a front scatter photodetector positioned to detect scattered light that is propagated at an angle of 180° with respect to the incident beam of light irradiation. In yet other instances, one or more of the filtered and unfiltered light scatter detectors is a back scatter photodetector positioned to detect scattered light that is propagated from 1° to 30° with respect to the incident beam of light irradiation, such as from 5° to 25° and including from 10° to 20° with respect to the incident beam of light irradiation. In certain instances, one or more of the filtered and unfiltered light scatter detectors is a back scatter photodetector positioned to detect scattered light that is propagated at an angle of 30° with respect to the incident beam of light irradiation.

Light from the flow stream is detected in two or more photodetector channels, such as 3 or more, such as 4 or more, such as 5 or more, such as 6 or more, such as 7 or more, such as 8 or more, such as 9 or more and including 10 or more photodetector channels. In some embodiments, light is detected in a different photodetector for each light source (e.g., each laser) used to irradiate the flow stream. For instance, where the particles in the flow stream is irradiated by a first laser and a second laser, light each particle in the flow stream irradiated by the first laser may be detected in a first photodetector channel and light from each particle in the flow stream irradiated by the second laser may be detected in a second photodetector channel. In certain embodiments, scattered light from each particle in the flow stream irradiated by the first laser is detected in a first photodetector channel and scattered light from each particle in the flow stream irradiated by the second laser is detected in a second photodetector channel.

In some embodiments, the memory includes instructions which cause the processor to generate one or more signal pulses in each photodetector channel in response to detected light. In some instances, the memory includes instructions for generating a plurality of signal pulses in each photodetector channel in response to the detected light, such as generating 2 or more signal pulses, such as 3 or more signal pulses, such as 4 or more signal pulses, such as 5 or more signal pulses, such as 6 or more signal pulses, such as 7 or more signal pulses, such as 8 or more signal pulses, such as 9 or more signal pulses and including generating 10 or more signal pulses in each photodetector channel in response to detected light. In some instances, the memory includes instructions to generate one or more signal pulses in a different photodetector channel in response to light detected from particles irradiated by each light source (e.g., each laser). For instance, where the particles in the flow stream is irradiated by a first laser and a second laser, the memory may include instructions for generating a signal pulse in a first photodetector channel in response to light detected from each particle that is irradiated by the first laser and instructions for generating a signal pulse in a second photodetector channel in response to light detected from each particle that is irradiated by the second laser.

In some embodiments, the memory includes instructions which cause the processor to determine an amount of time between photodetector signal pulses. In some instances, the memory includes instructions for determining the amount of time between signal pulses in two or more different photodetector channels, such as 3 or more different photodetector channels, such as 4 or more different photodetector channels, such as 5 or more different photodetector channels, such as 6 or more different photodetector channels, such as 7 or more different photodetector channels, such as 8 or more different photodetector channels, such as 9 or more different photodetector channels and including instructions for determining the amount of time between signal pulses in 10 or more different photodetector channels. In some instances, the time between signal pulses in the two or more different photodetector channels may be 0.00001 μs or more, such as 0.00005 μs or more, such as 0.0001 μs or more, such as 0.0005 μs or more, such as 0.001 μs or more, such as 0.005 μs, such as 0.01 μs or more, such as 0.05 μs or more, such as 0.1 μs or more, such as 0.5 μs or more, such as 1 μs or more, such as 5 μs or more, such as 10 μs or more, such as 25 μs or more, such as 50 μs or more, such as 100 μs or more, such as 500 μs or more and including 1000 μs or more. In certain instances, the time between signal pulses in the two or more different photodetector channels ranges from 0.00001 μs to 5000 μs, such as from 0.0001 μs to 4000 μs, such as from 0.001 μs to 3000 μs, such as from 0.01 μs to 2000 μs, such as from 0.1 μs to 1000 μs and including from 1 μs to 500 μs.

In some embodiments, the memory includes instructions which cause the processor to determine a time-to-peak duration between photodetector signal pulses. In some instances, the memory includes instructions for determining the time-to-peak duration between signal pulses in two or more different photodetector channels, such as 3 or more different photodetector channels, such as 4 or more different photodetector channels, such as 5 or more different photodetector channels, such as 6 or more different photodetector channels, such as 7 or more different photodetector channels, such as 8 or more different photodetector channels, such as 9 or more different photodetector channels and including instructions for determining the time-to-peak duration between signal pulses in 10 or more different photodetector channels. In some instances, the time-to-peak duration between signal pulses in the two or more different photodetector channels may be 0.00001 μs or more, such as 0.00005 μs or more, such as 0.0001 μs or more, such as 0.0005 μs or more, such as 0.001 μs or more, such as 0.005 μs, such as 0.01 μs or more, such as 0.05 μs or more, such as 0.1 μs or more, such as 0.5 μs or more, such as 1 μs or more, such as 5 μs or more, such as 10 μs or more, such as 25 μs or more, such as 50 μs or more, such as 100 μs or more, such as 500 μs or more and including 1000 μs or more. In certain instances, the time-to-peak duration between signal pulses in the two or more different photodetector channels ranges from 0.00001 μs to 5000 μs, such as from 0.0001 μs to 4000 μs, such as from 0.001 μs to 3000 μs, such as from 0.01 μs to 2000 μs, such as from 0.1 μs to 1000 μs and including from 1 μs to 500 μs. In some embodiments, the memory includes instructions which cause the processor to determine a first order moment of the signal pulses in each of the photodetector channels, such as a first order moment in the signal pulses in two or more photodetector channels, such as 3 or more photodetector channels, such as 4 or more photodetector channels, such as 5 or more photodetector channels, such as 6 or more photodetector channels, such as 7 or more photodetector channels, such as 8 or more photodetector channels, such as 9 or more photodetector channels and including determining a first order moment of the signal pulses in 10 or more of photodetector channels.

In some embodiments, systems include a processor with memory operably coupled to the processor where the memory has instructions stored thereon, which when executed by the processor, cause the processor to calculate the velocity of each particle of interest in the flow stream. In some instances, the memory includes instructions for independently calculating the velocity of 1 or more particles in the sample, such as the velocities of 2 or more particles in the sample, such as the velocities of 5 or more particles in the sample, such as the velocities of 10 or more particles in the sample, such as the velocities of 25 or more particles in the sample, such as the velocities of 50 or more particles in the sample, such as the velocities of 100 or more particles in the sample, such as the velocities of 250 or more particles in the sample and include independently calculating the velocities of 500 or more particles in the sample. For example, the memory may include instructions for independently calculating the velocities of 0.0001% or more of the particles in the sample, such as 0.0005% or more, such as 0.001% or more, such as 0.005% or more, such as 0.01% or more, such as 0.05% or more, such as 0.1% or more, such as 0.5% or more, such as 1% or more, such as 5% or more, such as 10% or more, such as 25% or more, such as 50% or more, such as 75% or more and including instructions for independently calculating the velocities of 90% or more of the particles in the sample.

In some embodiments, the memory includes instructions which cause the processor to calculate the velocity for each particle based on the amount of time between a signal pulse in two or more photodetector channels and the distance between two or more interrogation regions. In one embodiment, the memory includes instructions to calculate the velocity for each particle based on the amount of time between a signal pulse from a first photodetector channel and a signal pulse from a second photodetector channel and the distance between the interrogation region of the first laser and the interrogation region of the second laser. In some instances, the memory includes instructions for determining the distance between the first interrogation region and the second interrogation region based on the distance between the position of irradiation by the first laser on the flow stream and the position of irradiation by the second laser on the flow stream. For example, depending on the particle analyzer in certain instances the distance between the first interrogation region and the second interrogation region is 0.01 μm or more, such as by 0.05 μm or more, such as by 0.1 μm or more, such as by 0.5 μm or more, such as by 1 μm or more, such as by 2 μm or more, such as by 3 μm or more, such as by 4 μm or more, such as by 5 μm or more, such as by 10 μm or more, such as by 15 μm or more, such as by 25 μm or more, such as by 50 μm or more and including by 100 μm or more. In other instances, the distance between the first interrogation region and the second interrogation region ranges from 0.01 μm to 500 μm, such as from 0.05 μm to 450 μm, such as from 0.1 μm to 400 μm, such as from 0.5 μm to 350 μm, such as from 1 μm to 200 μm, such as from 5 μm to 150 μm and including from 10 μm to 100 μm.

In some embodiments, the memory includes instructions which cause the processor to calculate the drop delay of each particle based on the calculated velocity and the distance between an interrogation region of one or more of the light sources and the flow cell nozzle orifice. In some embodiments, the memory include instructions for independently determining drop delay of each particle by multiplying the calculated velocity of each particle of interest by the distance between an interrogation region of one or more of the light sources and the flow cell nozzle orifice. For example, depending on the particle analyzer in certain instances the distance between each interrogation region and the flow cell nozzle orifice is independently 0.01 μm or more, such as by 0.05 μm or more, such as by 0.1 μm or more, such as by 0.5 μm or more, such as by 1 μm or more, such as by 2 μm or more, such as by 3 μm or more, such as by 4 μm or more, such as by 5 μm or more, such as by 10 μm or more, such as by 15 μm or more, such as by 25 μm or more, such as by 50 μm or more and including by 100 μm or more. In other instances, the distance between each interrogation region and the flow cell nozzle orifice ranges from 0.01 μm to 500 μm, such as from 0.05 μm to 450 μm, such as from 0.1 μm to 400 μm, such as from 0.5 μm to 350 μm, such as from 1 μm to 200 μm, such as from 5 μm to 150 μm and including from 10 μm to 100 μm.

In certain embodiments, systems include a processor with memory operably coupled to the processor where the memory has instructions stored thereon, which when executed by the processor, cause the processor to adjust one or more parameters of the particle analyzer based on one or more of the calculated velocity for each particle in the flow stream and the calculated drop delay. In some instances, the memory includes instructions for increasing the flow rate of the flow stream based on one or more of the calculated velocity for each particle in the flow stream and the calculated drop delay. In certain instances, the flow rate may be increased by 1% or more, such as by 5% or more, such as by 10% or more, such as by 15% or more, such as by 25% or more, such as by 50% or more, such as by 75% or more, such as by 90% or more, such as by 95% or more, such as by 97% or more, such as by 99% or more and including increasing the flow rate of the flow stream by 99.9% or more. In some embodiments, the flow rate of the flow stream is increased by 1 μL/sec or more, such as 2 μL/sec or more, such as 5 μL/sec or more, such as 10 μL/sec or more, such as 25 μL/sec or more, such as 50 μL/sec or more, such as 100 μL/sec or more, such as 250 μL/sec or more, such as 500 μL/sec or more, such as 750 μL/sec or more and including 1000 μL/sec or more. In other embodiments, the flow rate of the flow stream is increased by 0.001 mm/sec or more, such as by 0.005 mm/sec or more, such as by 0.01 mm/sec or more, such as by 0.05 mm/sec or more, such as by 0.1 mm/sec or more, such as by 0.5 mm/sec or more, such as by 1 mm/sec or more, such as by 5 mm/sec or more and including where the flow rate of the flow stream is increased by 10 mm/sec or more.

In other instances, the memory includes instructions for decreasing the flow rate of the flow stream based on one or more of the calculated velocity for each particle in the flow stream and the calculated drop delay. In certain instances, the flow rate may be decreased by 1% or more, such as by 5% or more, such as by 10% or more, such as by 15% or more, such as by 25% or more, such as by 50% or more, such as by 75% or more, such as by 90% or more, such as by 95% or more, such as by 97% or more, such as by 99% or more and including decreasing the flow rate of the flow stream by 99.9% or more. In some embodiments, the flow rate of the flow stream is decreased by 1 μL/sec or more, such as 2 μL/sec or more, such as 5 μL/sec or more, such as 10 μL/sec or more, such as 25 μL/sec or more, such as 50 μL/sec or more, such as 100 μL/sec or more, such as 250 μL/sec or more, such as 500 μL/sec or more, such as 750 μL/sec or more and including 1000 μL/sec or more. In other embodiments, the flow rate of the flow stream is decreased by 0.001 mm/sec or more, such as by 0.005 mm/sec or more, such as by 0.01 mm/sec or more, such as by 0.05 mm/sec or more, such as by 0.1 mm/sec or more, such as by 0.5 mm/sec or more, such as by 1 mm/sec or more, such as by 5 mm/sec or more and including where the flow rate of the flow stream is decreasing by 10 mm/sec or more.

In other instances, the memory includes instructions for adjusting the timing of droplet charging based on one or more of the calculated velocity for each particle in the flow stream and the calculated drop delay. In some instances, the timing of droplet charging is adjusted to be delayed by 0.01% or more, such as by 0.05% or more, such as by 0.1% or more, such as by 0.5% or more, such as by 1% or more, such as by 2% or more, such as by 5% or more, such as by 10% or more, such as by 15% or more, such as by 25% or more and including by 50% or more. For example, the timing of droplet charging may be delayed by a 0.0001 μs or more in response to the calculated velocity for each particle in the flow stream and the calculated drop delay, such as by 0.0005 μs or more, such as by 0.001 μs or more, such as by 0.005 μs or more, such as by 0.01 μs or more, such as by 0.05 μs or more, such as by 0.1 μs or more, such as by 0.5 μs or more, such as by 1 μs or more, such as by 5 μs or more, such as by 10 μs or more, such as by 25 μs or more, such as by 50 μs or more, such as by 100 μs or more and including delaying droplet charging by 500 μs or more in response to the calculated velocity for each particle in the flow stream and the calculated drop delay. In other instances, the timing of droplet charging is adjusted to be earlier by 0.01% or more, such as by 0.05% or more, such as by 0.1% or more, such as by 0.5% or more, such as by 1% or more, such as by 2% or more, such as by 5% or more, such as by 10% or more, such as by 15% or more, such as by 25% or more and including by 50% or more. For example, the timing of droplet charging may be adjusted to be earlier by 0.0001 μs or more in response to the calculated velocity for each particle in the flow stream and the calculated drop delay, such as by 0.0005 μs or more, such as by 0.001 μs or more, such as by 0.005 μs or more, such as by 0.01 μs or more, such as by 0.05 μs or more, such as by 0.1 μs or more, such as by 0.5 μs or more, such as by 1 μs or more, such as by 5 μs or more, such as by 10 μs or more, such as by 25 μs or more, such as by 50 μs or more, such as by 100 μs or more and including by 500 μs or more.

In other instances, the memory includes instructions for adjusting the drop drive frequency based on one or more of the calculated velocity for each particle in the flow stream and the calculated drop delay. In some instances, the drop drive frequency is increased, such as by 0.01 Hz or more, such as by 0.05 Hz or more, such as by 0.1 Hz or more, such as by 0.25 Hz or more, such as by 0.5 Hz or more, such as by 1 Hz or more, such as by 2.5 Hz or more, such as by 5 Hz or more, such as by 10 Hz or more and including by 25 Hz or more. For example, the drop drive frequency may be increased by 1% or more, such as by 5% or more, such as by 10% or more, such as by 15% or more, such as by 25% or more, such as by 50% or more, such as by 75% or more and including increasing the drop drive frequency by 90% or more. In other instances, the drop drive frequency is reduced, such as by 0.01 Hz or more, such as by 0.05 Hz or more, such as by 0.1 Hz or more, such as by 0.25 Hz or more, such as by 0.5 Hz or more, such as by 1 Hz or more, such as by 2.5 Hz or more, such as by 5 Hz or more, such as by 10 Hz or more and including by 25 Hz or more. For example, the drop drive frequency may be reduced by 1% or more, such as by 5% or more, such as by 10% or more, such as by 15% or more, such as by 25% or more, such as by 50% or more, such as by 75% or more and including reducing the drop frequency by 90% or more.

In other instances, the memory includes instructions for adjusting the drop delay based on one or more of the calculated velocity for each particle in the flow stream and the calculated drop delay. In some instances, the drop delay is increased, such as by 0.01 μs or more, such as by 0.05 μs or more, such as by 0.1 μs or more, such as by 0.3 μs or more, such as by 0.5 μs or more, such as by 1 μs or more, such as by 2.5 μs or more, such as by 5 μs or more, such as by 7.5 μs or more and including increasing the drop delay by 10 μs or more. For example, the drop delay may be increased by 1% or more, such as by 5% or more, such as by 10% or more, such as by 15% or more, such as by 25% or more, such as by 50% or more, such as by 75% or more and including increasing the drop delay by 90% or more. In other instances, the drop frequency is reduced, such as by 0.01 μs or more, such as by 0.05 μs or more, such as by 0.1 μs or more, such as by 0.3 μs or more, such as by 0.5 μs or more, such as by 1 μs or more, such as by 2.5 μs or more, such as by 5 μs or more, such as by 7.5 μs or more and including reducing the drop delay by 10 μs or more. For example, the drop delay may be reduced by 1% or more, such as by 5% or more, such as by 10% or more, such as by 15% or more, such as by 25% or more, such as by 50% or more, such as by 75% or more and including reducing the drop delay by 90% or more.

In certain embodiments, systems further include a flow cell configured to propagate the sample in the flow stream. Any convenient flow cell which propagates a fluidic sample to a sample interrogation region may be employed, where in some embodiments, the flow cell includes a proximal cylindrical portion defining a longitudinal axis and a distal frustoconical portion which terminates in a flat surface having the orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the flow cell does not include a cylindrical portion and the entire flow cell inner chamber is frustoconically shaped. In these embodiments, the length of the frustoconical inner chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical inner chamber may range from 1 mm to 10 mm, such as from 2 mm to 9 mm, such as from 3 mm to 8 mm and including from 4 mm to 7 mm.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 μm to 20000 μm, such as from 2 μm to 17500 μm, such as from 5 μm to 15000 μm, such as from 10 μm to 12500 μm, such as from 15 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the nozzle orifice is 100 μm.

In some embodiments, the flow cell includes a sample injection port configured to provide a sample to the flow cell. In embodiments, the sample injection system is configured to provide suitable flow of sample to the flow cell inner chamber. Depending on the desired characteristics of the flow stream, the rate of sample conveyed to the flow cell chamber by the sample injection port may be 1 μL/min or more, such as 2 μL/min or more, such as 3 μL/min or more, such as 5 μL/min or more, such as 10 μL/min or more, such as 15 μL/min or more, such as 25 μL/min or more, such as 50 μL/min or more and including 100 μL/min or more, where in some instances the rate of sample conveyed to the flow cell chamber by the sample injection port is 1 μL/sec or more, such as 2 μL/sec or more, such as 3 μL/sec or more, such as 5 μL/sec or more, such as 10 μL/sec or more, such as 15 μL/sec or more, such as 25 μL/sec or more, such as 50 μL/sec or more and including 100 μL/sec or more.

The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 μL/sec or more, such as 50 μL/sec or more, such as 75 μL/sec or more, such as 100 μL/sec or more, such as 250 μL/sec or more, such as 500 μL/sec or more, such as 750 μL/sec or more, such as 1000 μL/sec or more and including 2500 μL/sec or more.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for detecting light from the sample in the flow stream. In some instances, the rate of sample flow in the flow cell is 1 μL/min (microliter per minute) or more, such as 2 μL/min or more, such as 3 μL/min or more, such as 5 μL/min or more, such as 10 μL/min or more, such as 25 μL/min or more, such as 50 μL/min or more, such as 75 μL/min or more, such as 100 μL/min or more, such as 250 μL/min or more, such as 500 μL/min or more, such as 750 μL/min or more and including 1000 μL/min or more. For example, the system may include a pump that is configured to flow sample through the flow cell at a rate that ranges from 1 μL/min to 500 μL/min, such as from 1 uL/min to 250 uL/min, such as from 1 uL/min to 100 uL/min, such as from 2 μL/min to 90 μL/min, such as from 3 μL/min to 80 μL/min, such as from 4 μL/min to 70 μL/min, such as from 5 μL/min to 60 μL/min and including rom 10 μL/min to 50 μL/min. In certain embodiments, the flow rate of the flow stream is from 5 μL/min to 6 μL/min.

In certain embodiments, the subject systems are flow cytometric systems. Suitable flow cytometry systems may include, but are not limited to those described in Ormerod (ed.), *Flow Cytometry: A Practical Approach,* Oxford Univ. Press (1997); Jaroszeski et al. (eds.), *Flow Cytometry Protocols,* Methods in Molecular Biology No. 91, Humana Press (1997); *Practical Flow Cytometry,* 3rd ed., Wiley-Liss (1995); Virgo, et al. (2012) *Ann Clin Biochem.* January; 49(pt 1):17-28; Linden, et. al., *Semin Throm Hemost.* 2004 October; 30(5):502-11; Alison, et al. *J Pathol,* 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject systems are particle sorting systems, such those described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In some embodiments, the subject systems are particle sorting systems that are configured to sort particles with an enclosed particle sorting module, such as those described in U.S. Patent Publication No. 2017/0299493, the disclosure of which is incorporated herein by reference. In certain embodiments, particles (e.g, cells) of the sample are sorted using a sort decision module having a plurality of sort decision units, such as those described in U.S. Patent Publication No. 2020/0256781, the disclosure of which is incorporated herein by reference. In some embodiments, the subject systems include a particle sorting module having deflector plates, such as described in U.S. Patent Publication No. 2017/0299493, filed on Mar. 28, 2017, the disclosure of which is incorporated herein by reference.

In certain instances, systems of interest are flow cytometry systems configured for imaging particles in a flow stream by fluorescence imaging using radiofrequency tagged emission (FIRE), such as those described in Diebold, et al. *Nature Photonics* Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

Figure 4A:
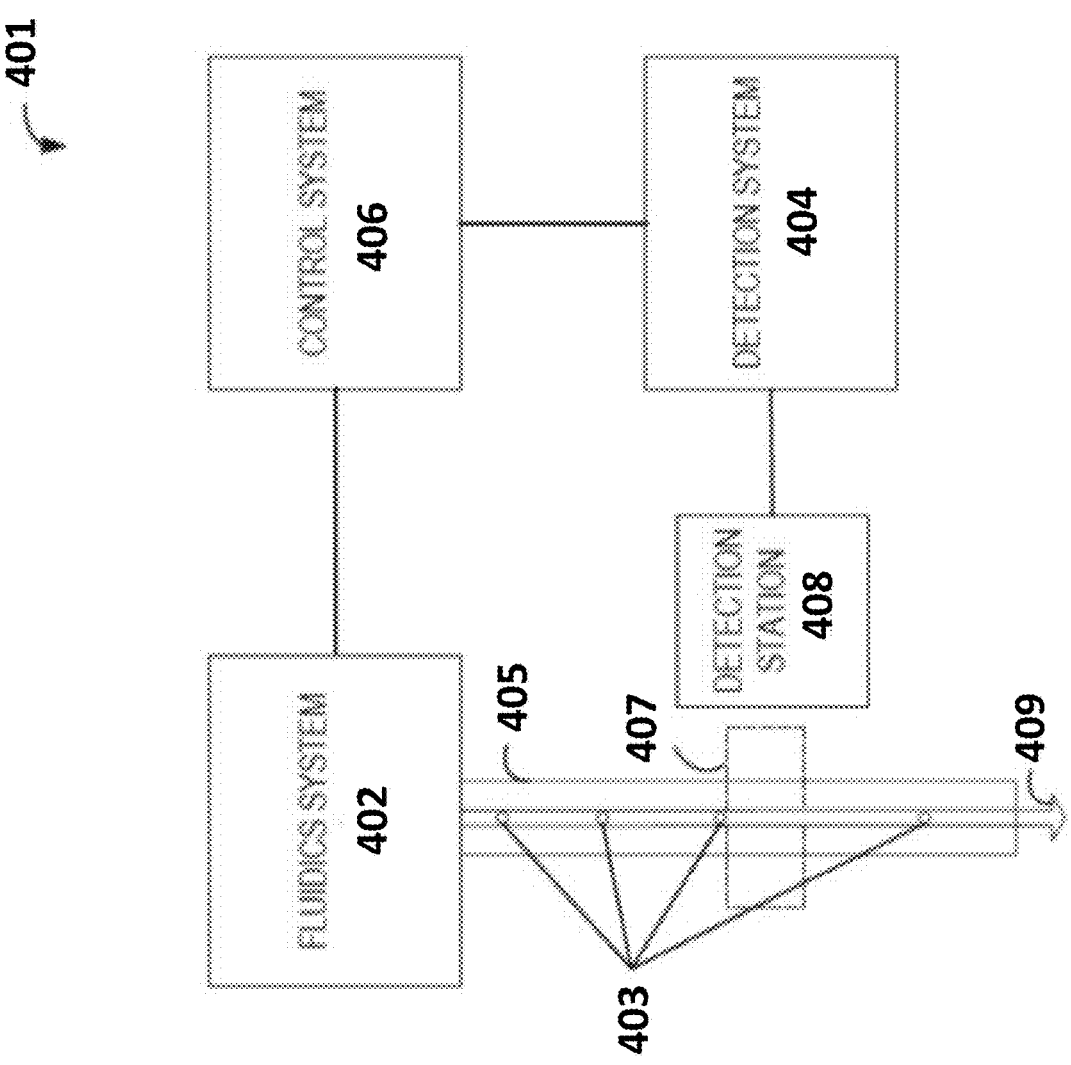
FIG. 4A depicts a functional block diagram of a particle analysis system according to certain embodiments.

In some embodiments, systems are particle analyzers where the particle analysis system 401 (FIG. 4A) can be used to analyze and characterize particles, with or without physically sorting the particles into collection vessels. FIG. 4A shows a functional block diagram of a particle analysis system for computational based sample analysis and particle characterization. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
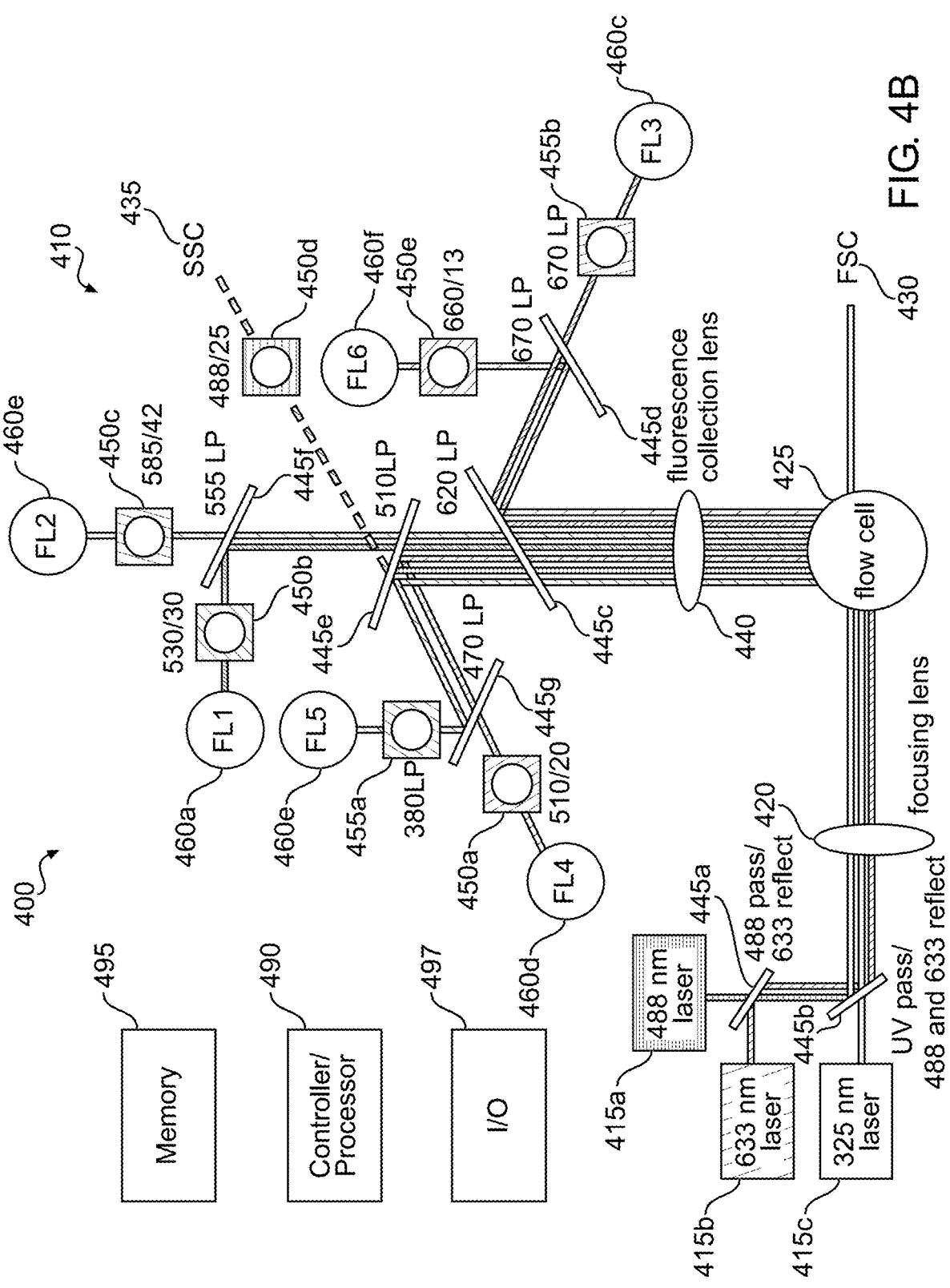
FIG. 4B depicts a flow cytometer according to certain embodiments.

FIG. 4B shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 115a-c emit light in the form of a laser beam. The wavelengths of the laser beams emitted from excitation lasers 415a-415c are 488 nm, 633 nm, and 325 nm, respectively, in the example system of FIG. 4B. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 5:
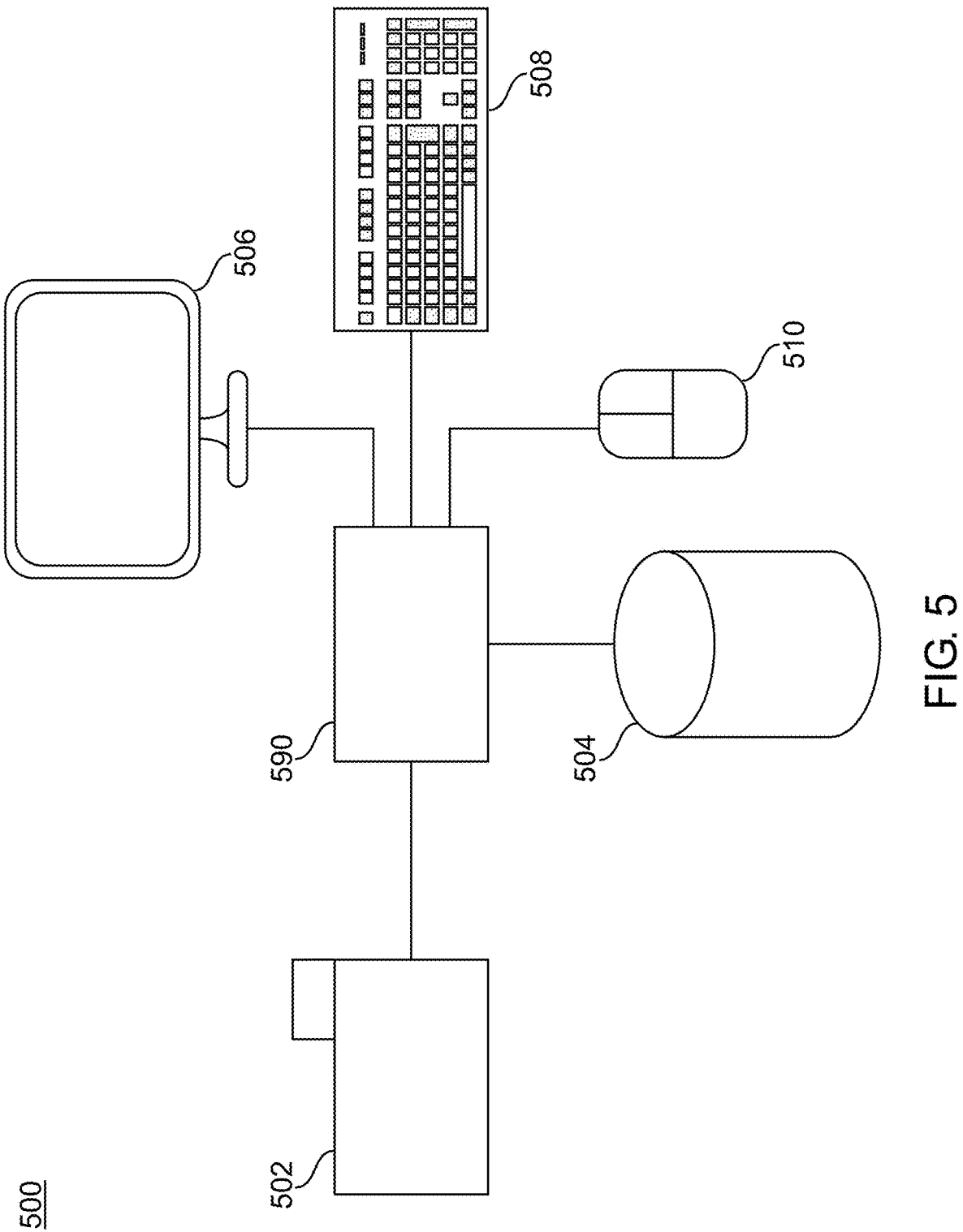
FIG. 5 depicts a functional block diagram for one example of a particle analyzer control system according to certain embodiments.

FIG. 5 shows a functional block diagram for one example of a particle analyzer control system, such as an analytics controller 500, for analyzing and displaying biological events. An analytics controller 500 can be configured to implement a variety of processes for controlling graphic display of biological events.

A particle analyzer or sorting system 502 can be configured to acquire biological event data. For example, a flow cytometer can generate flow cytometric event data. The particle analyzer 502 can be configured to provide biological event data to the analytics controller 500. A data communication channel can be included between the particle analyzer or sorting system 502 and the analytics controller 500. The biological event data can be provided to the analytics controller 500 via the data communication channel.

The analytics controller 500 can be configured to receive biological event data from the particle analyzer or sorting system 502. The biological event data received from the particle analyzer or sorting system 502 can include flow cytometric event data. The analytics controller 500 can be configured to provide a graphical display including a first plot of biological event data to a display device 506. The analytics controller 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 500 can be further configured to display the biological event data on the display device 506 within the gate differently from other events in the biological event data outside of the gate. For example, the analytics controller 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The analytics controller 500 can be configured to receive a gate selection signal identifying the gate from a first input device. For example, the first input device can be implemented as a mouse 510. The mouse 510 can initiate a gate selection signal to the analytics controller 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 500 to alter the manner in which the data is displayed, which portions of the data is actually displayed on the display device 506, and/or provide input to further processing such as selection of a population of interest for particle sorting.

In some embodiments, the analytics controller 500 can be configured to detect when gate selection is initiated by the mouse 510. The analytics controller 500 can be further configured to automatically modify plot visualization to facilitate the gating process. The modification can be based on the specific distribution of biological event data received by the analytics controller 500.

The analytics controller 500 can be connected to a storage device 504. The storage device 504 can be configured to receive and store biological event data from the analytics controller 500. The storage device 504 can also be configured to receive and store flow cytometric event data from the analytics controller 500. The storage device 504 can be further configured to allow retrieval of biological event data, such as flow cytometric event data, by the analytics controller 500.

A display device 506 can be configured to receive display data from the analytics controller 500. The display data can comprise plots of biological event data and gates outlining sections of the plots. The display device 506 can be further configured to alter the information presented according to input received from the analytics controller 500 in conjunction with input from the particle analyzer 502, the storage device 504, the keyboard 508, and/or the mouse 510.

In some implementations, the analytics controller 500 can generate a user interface to receive example events for sorting. For example, the user interface can include a control for receiving example events or example images. The example events or images or an example gate can be provided prior to collection of event data for a sample, or based on an initial set of events for a portion of the sample.

Figure 6A:
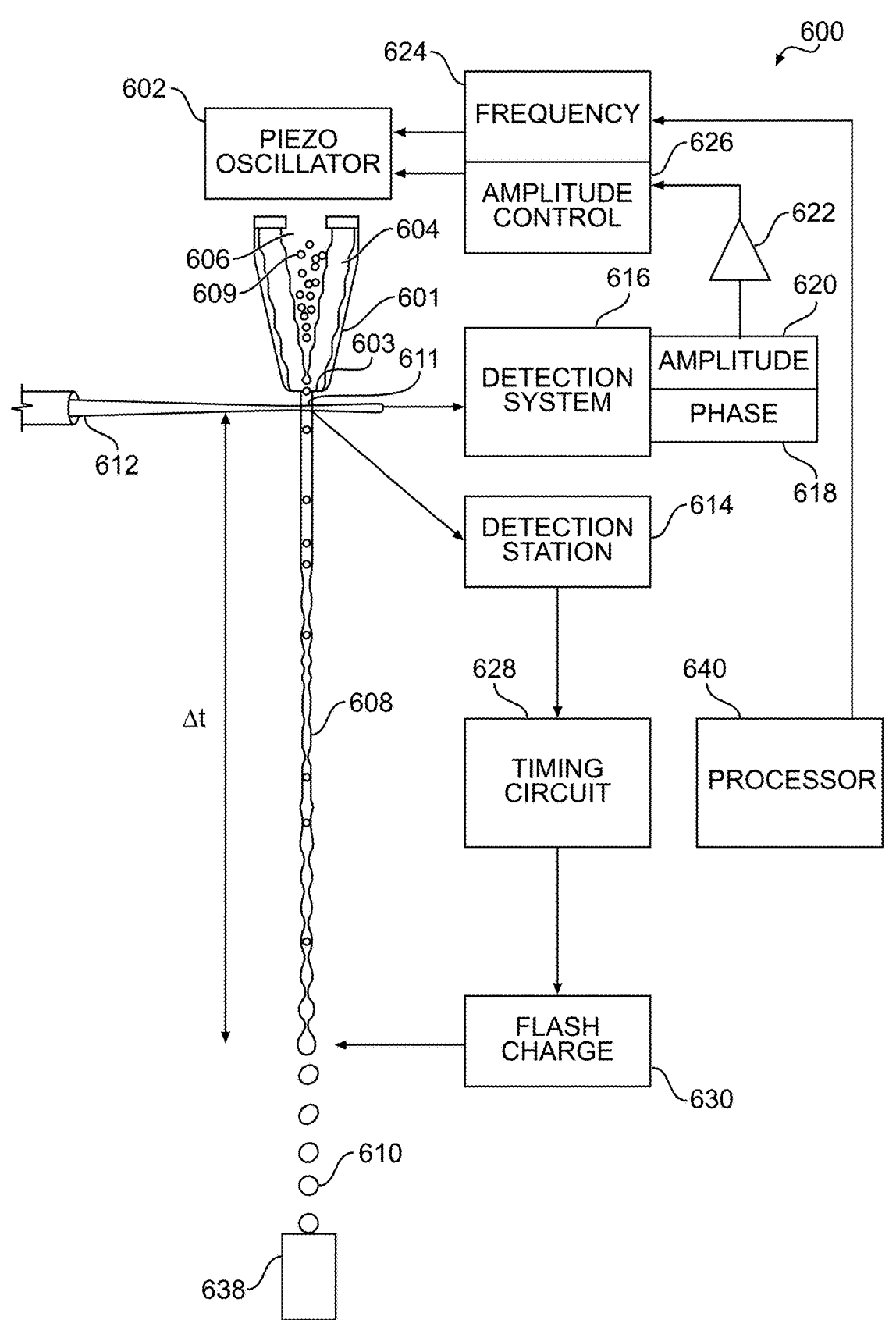
FIG. 6A depicts a schematic drawing of a particle sorter system according to certain embodiments.

FIG. 6A is a schematic drawing of a particle sorter system 600 (e.g., the particle analyzer or sorting system 502) in accordance with one embodiment presented herein. In some embodiments, the particle sorter system 600 is a cell sorter system. As shown in FIG. 6A, a drop formation transducer 602 (e.g., piezo-oscillator) is coupled to a fluid conduit 601, which can be coupled to, can include, or can be, a nozzle 603. Within the fluid conduit 601, sheath fluid 604 hydrodynamically focuses a sample fluid 606 comprising particles 609 into a moving fluid column 608 (e.g. a stream). Within the moving fluid column 608, particles 609 (e.g., cells) are lined up in single file to cross a monitored area 611 (e.g., where laser-stream intersect), irradiated by an irradiation source 612 (e.g., a laser). Vibration of the drop formation transducer 602 causes moving fluid column 608 to break into a plurality of drops 610, some of which contain particles 609.

In operation, a detection station 614 (e.g., an event detector) identifies when a particle of interest (or cell of interest) crosses the monitored area 611. Detection station 614 feeds into a timing circuit 628, which in turn feeds into a flash charge circuit 630. At a drop break off point, informed by a timed drop delay (Δt), a flash charge can be applied to the moving fluid column 608 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 6A, the drops can be collected in a drain receptacle 638.

A detection system 616 (e.g. a drop boundary detector) serves to automatically determine the phase of a drop drive signal when a particle of interest passes the monitored area 611. An exemplary drop boundary detector is described in U.S. Pat. No. 7,679,039, which is incorporated herein by reference in its entirety. The detection system 616 allows the instrument to accurately calculate the place of each detected particle in a drop. The detection system 616 can feed into an amplitude signal 620 and/or phase 618 signal, which in turn feeds (via amplifier 622) into an amplitude control circuit 626 and/or frequency control circuit 624. The amplitude control circuit 626 and/or frequency control circuit 624, in turn, controls the drop formation transducer 602. The amplitude control circuit 626 and/or frequency control circuit 624 can be included in a control system.

In some implementations, sort electronics (e.g., the detection system 616, the detection station 614 and a processor 640) can be coupled with a memory configured to store the detected events and a sort decision based thereon. The sort decision can be included in the event data for a particle. In some implementations, the detection system 616 and the detection station 614 can be implemented as a single detection unit or communicatively coupled such that an event measurement can be collected by one of the detection system 616 or the detection station 614 and provided to the non-collecting element.

Figure 6B:
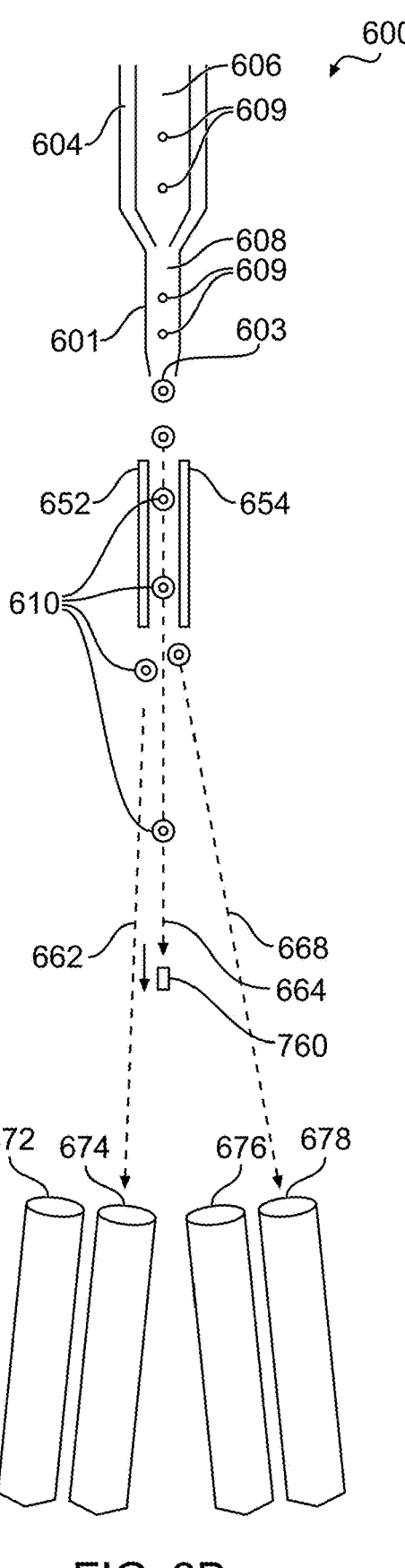
FIG. 6B depicts a schematic drawing of a particle sorter system according to certain embodiments.

FIG. 6B is a schematic drawing of a particle sorter system, in accordance with one embodiment presented herein. The particle sorter system 600 shown in FIG. 6B, includes deflection plates 652 and 654. A charge can be applied via a stream-charging wire in a barb. This creates a stream of droplets 610 containing particles 610 for analysis. The particles can be illuminated with one or more light sources (e.g., lasers) to generate light scatter and fluorescence information. The information for a particle is analyzed such as by sorting electronics or other detection system (not shown in FIG. 6B). The deflection plates 652 and 654 can be independently controlled to attract or repel the charged droplet to guide the droplet toward a destination collection receptacle (e.g., one of 672, 674, 676, or 678). As shown in FIG. 6B, the deflection plates 652 and 654 can be controlled to direct a particle along a first path 662 toward the receptacle 674 or along a second path 668 toward the receptacle 678. If the particle is not of interest (e.g., does not exhibit scatter or illumination information within a specified sort range), deflection plates may allow the particle to continue along a flow path 664. Such uncharged droplets may pass into a waste receptacle such as via aspirator 670.

The sorting electronics can be included to initiate collection of measurements, receive fluorescence signals for particles, and determine how to adjust the deflection plates to cause sorting of the particles. Example implementations of the embodiment shown in FIG. 6B include the BD FACSAria™ line of flow cytometers commercially provided by Becton, Dickinson and Company (Franklin Lakes, N.J.).

Computer-Controlled Systems

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for irradiating a sample comprising the plurality of particles in the flow stream with a first laser in a first interrogation region and a second laser in a second interrogation region, instructions for detecting light from each particle in a first photodetector channel and a second photodetector channel, instructions for calculating a velocity for each particle in the flow stream based on the detected light in the first photodetector channel and the second photodetector channel and instructions for determining the drop delay of each particle based on the calculated velocity.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, and others.

Figure 7:
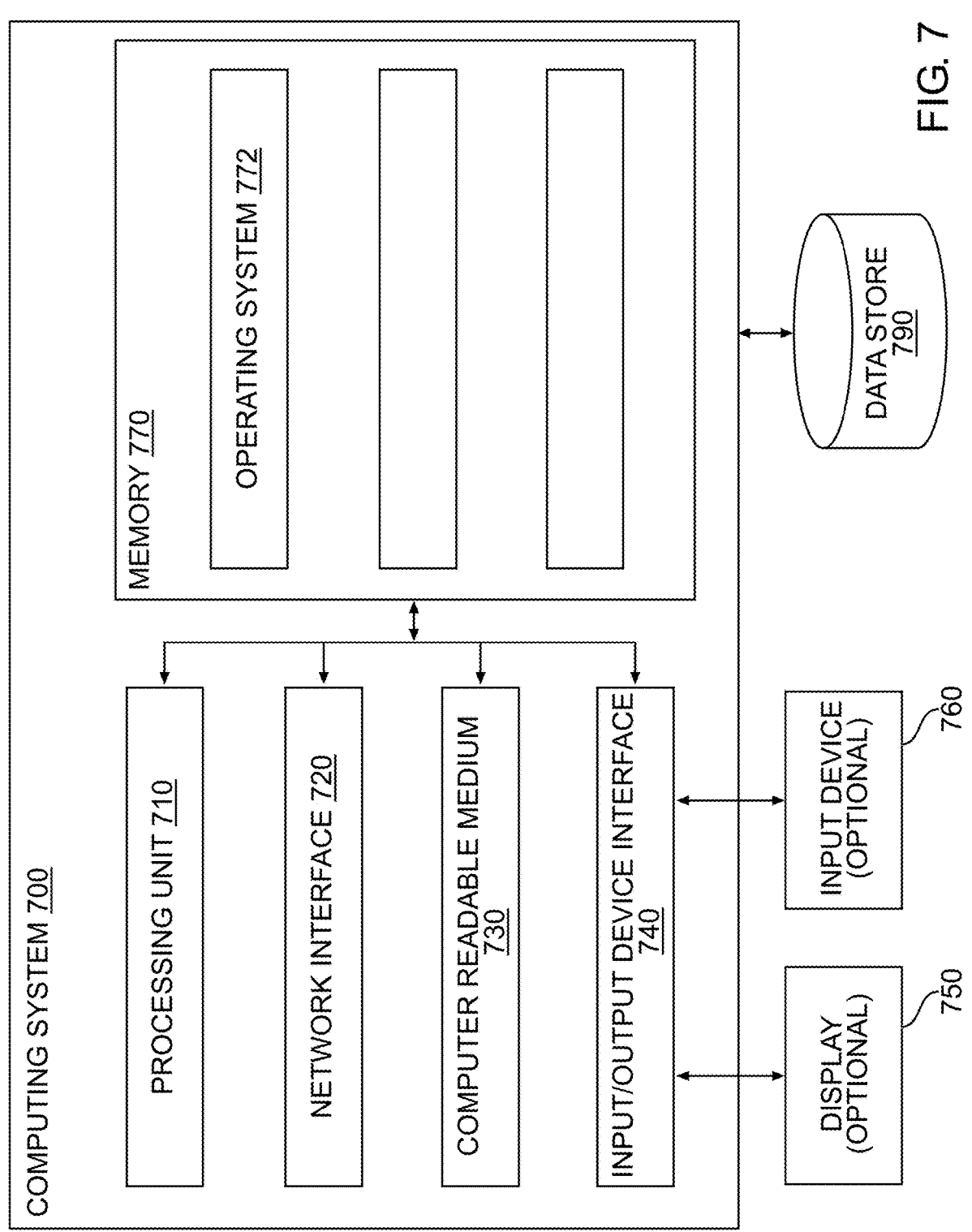
FIG. 7 depicts a block diagram of a computing system according to certain embodiments.

FIG. 7 depicts a general architecture of an example computing device 600 according to certain embodiments. The general architecture of the computing device 700 depicted in FIG. 7 includes an arrangement of computer hardware and software components. The computing device 700 may include many more (or fewer) elements than those shown in FIG. 7. It is not necessary, however, that all of these generally conventional elements be shown in order to provide an enabling disclosure. As illustrated, the computing device 700 includes a processing unit 710, a network interface 720, a computer readable medium drive 730, an input/output device interface 740, a display 750, and an input device 760, all of which may communicate with one another by way of a communication bus. The network interface 720 may provide connectivity to one or more networks or computing systems. The processing unit 710 may thus receive information and instructions from other computing systems or services via a network. The processing unit 710 may also communicate to and from memory 770 and further provide output information for an optional display 750 via the input/output device interface 740. The input/output device interface 740 may also accept input from the optional input device 760, such as a keyboard, mouse, digital pen, microphone, touch screen, gesture recognition system, voice recognition system, gamepad, accelerometer, gyroscope, or other input device.

The memory 770 may contain computer program instructions (grouped as modules or components in some embodiments) that the processing unit 710 executes in order to implement one or more embodiments. The memory 770 generally includes RAM, ROM and/or other persistent, auxiliary or non-transitory computer-readable media. The memory 770 may store an operating system 772 that provides computer program instructions for use by the processing unit 710 in the general administration and operation of the computing device 700. The memory 770 may further include computer program instructions and other information for implementing aspects of the present disclosure.

Computer-Readable Storage Medium

Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, Calif.), Visual Basic (Microsoft Corp., Redmond, Wash.), and C++ (AT&T Corp., Bedminster, N.J.), as well as any many others.

In some embodiments, computer readable storage media of interest include a computer program stored thereon, where the computer program when loaded on the computer includes instructions having: algorithm for irradiating a sample comprising the plurality of particles in the flow stream with a first laser in a first interrogation region and a second laser in a second interrogation region, algorithm for detecting light from each particle in a first photodetector channel and a second photodetector channel, algorithm for calculating a velocity for each particle in the flow stream based on the detected light in the first photodetector channel and the second photodetector channel and algorithm for determining the drop delay of each particle based on the calculated velocity.

In some embodiments, the non-transitory computer readable storage medium includes instructions having an algorithm for irradiating the flow stream with the second laser at a position downstream from the first laser. In some instances, the non-transitory computer readable storage medium includes algorithm for generating a first photodetector signal pulse in response to the light detected in the first photodetector channel and algorithm for generating a second photodetector signal pulse in response to the light detected in the second photodetector channel. In some instances, the instructions include algorithm for determining an amount of time between the first photodetector signal pulse and the second photodetector signal pulse. In some instances, the instructions include algorithm for determining a time-to-peak between the first photodetector signal pulse and the second photodetector signal pulse. In some instances, the instructions include algorithm for determining the first order moment of the first photodetector signal pulse and the second photodetector signal pulse. In some instances, the instructions include algorithm for calculating velocity for each particle in the flow stream based on the amount of time between the first photodetector signal pulse and the second photodetector signal pulse and a distance between the first laser and the second laser.

In some embodiments, the non-transitory computer readable storage medium is part of a particle analyzer having a flow cell with a flow cell nozzle for generating a droplet containing the particle and instructions include algorithm for calculating drop delay of each particle in the flow stream by multiplying the calculated velocity for each particle in the flow stream by the distance between the first interrogation region or second interrogation region and an orifice of the flow cell nozzle. In some instances, the instructions include algorithm for adjusting the drop delay of each particle based on one or more of the calculated velocity for each particle in the flow stream and the calculated drop delay. In some instances, the instructions include algorithm for adjusting one or more parameters of the particle analyzer based on one or more of the calculated velocity for each particle in the flow stream and the calculated drop delay. In certain instances, the instructions include algorithm for increasing the flow rate of the flow stream based on one or more of the calculated velocity for each particle in the flow stream and the calculated drop delay. In other instances, the instructions include algorithm for decreasing the flow rate of the flow stream based on one or more of the calculated velocity for each particle in the flow stream and the calculated drop delay. In other instances, the instructions include algorithm for adjusting the timing of droplet charging based on the calculated velocity for each particle in the flow stream. In other instances, the instructions include algorithm for irradiating the sample in the flow stream with a plurality of lasers, algorithm for detecting light from each particle in a plurality of photodetector channels, algorithm for generating a photodetector signal pulse in response to the detected light in each of the photodetector channels and algorithm for calculating a velocity for each particle in the flow stream based on the photodetector signal pulses in two or more of the photodetector channels. In certain instances, the non-transitory computer readable storage medium includes instructions with algorithm for calculating timing of irradiation of the flow stream by each of the lasers. In other instances, the non-transitory computer readable storage medium includes instructions with algorithm for calculating velocity for each particle in the flow stream based on the photodetector signal pulses in three or more of the photodetector channels.

The computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Integrated Circuit Devices

Aspects of the present disclosure also include integrated circuits for determining drop delay of a plurality of irradiated particles in a sample in a flow stream in accordance with the methods described herein. Integrated circuits according to certain embodiments include programming for calculating a velocity for each particle in the sample in the flow stream based on light detected from the irradiated particle in a first photodetector channel and light detected in a second photodetector channel and programming for determining the drop delay of each particle based on the calculated velocity. In some embodiments, the integrated circuit is a field programmable gate array (FPGA). In some embodiments, the integrated circuit is an application specific integrated circuit (ASIC). In some embodiments, the integrated circuit is a complex programmable logic device (CPLD).

In some embodiments, the integrated circuit includes programming for determining an amount of time between a signal pulse from the first photodetector and a signal pulse from the second photodetector. In some instances, the integrated circuit includes programming for determining a time-to-peak between the first photodetector signal pulse and the second photodetector signal pulse. In some instances, the integrated circuit includes programming for determining the first order moment of the first photodetector signal pulse and the second photodetector signal pulse. In some embodiments, the integrated circuit includes programming for calculating the velocity for each particle in the flow stream based on the amount of time between the first photodetector signal pulse and the second photodetector signal pulse. In some embodiments, the integrated circuit includes programming for calculating the drop delay of each particle by multiplying the calculated velocity for each particle in the flow stream by the distance between an interrogation region of the flow stream and an orifice of a flow cell nozzle configured to generate a droplet containing the particle.

In certain embodiments, the integrated circuit includes programming for adjusting the drop delay for each particle based on one or more of the calculated velocity for each particle in the flow stream and the calculated drop delay. In some instances, the integrated circuit includes programming for adjusting one or more parameters of the particle analyzer based on one or more of the calculated velocity for each particle in the flow stream and the calculated drop delay. In some instances, the integrated circuit includes programming for increasing the flow rate of the flow stream based on one or more of the calculated velocity for each particle in the flow stream and the calculated drop delay. In other instances, the integrated circuit includes programming for decreasing the flow rate of the flow stream based on one or more of the calculated velocity for each particle in the flow stream and the calculated drop delay. In other instances, the integrated circuit includes programming for adjusting the timing of droplet charging based on one or more of the calculated velocity for each particle in the flow stream and the calculated drop delay.

Kits

Kits including one or more components of the subject systems are also provided. Kits according to certain embodiments include two or more light sources, such as two continuous wave lasers and a photodetector (e.g., a photomultiplier tube). Kits may also include a flow cell nozzle as well as a cuvette for irradiating the flow stream. Kits may also include an optical adjustment component, such as lenses, mirrors, filters, fiber optics, wavelength separators, pinholes, slits, collimating protocols and combinations thereof.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject methods, systems and computer systems find use in a variety of applications where it is desirable to optimize particle identification, characterization and sorting. The subject methods and systems provide for dynamic particle velocity and drop delay determination in real time. The present disclosure also finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment during sample analysis with a flow cytometer. In certain embodiments, the subject methods and systems provide fully automated protocols so that adjustments to a flow cytometer during use require little, if any human input.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method for adjusting a droplet charge timing for a particle in a flow stream in a particle analyzer, the method comprising:

irradiating in a cuvette a sample comprising the particle in the flow stream with a first laser in a first interrogation region within the cuvette and a second laser in a second interrogation region within the cuvette;

detecting light from the particle in a first photodetector channel and a second photodetector channel;

calculating a velocity for the particle in the flow stream based on a time-to-peak between detected light in the first photodetector channel and the second photodetector channel;

determining the drop delay of the particle based on the calculated velocity for the particle;

adjusting the droplet charge timing for the particle based on the drop delay; and adjusting the drop delay and a drop drive frequency, in each case based on one or more of the calculated velocity and the calculated drop delay.

2. The method according to claim 1, wherein the second laser is configured to irradiate the flow stream at a position downstream from the first laser.

3. The method according to claim 1, wherein the method comprises:

generating a first photodetector signal pulse in response to the light detected in the first photodetector channel; and generating a second photodetector signal pulse in response to the light detected in the second photodetector channel.

4. The method according to claim 3, wherein the method further comprises determining an amount of time between the first photodetector signal pulse and the second photodetector signal pulse.

5. The method according to claim 3, wherein the method further comprises determining a time-to-peak between the first photodetector signal pulse and the second photodetector signal pulse.

6. The method according to claim 3, wherein the method further comprises determining the first order moment of the first photodetector signal pulse and the second photodetector signal pulse.

7. The method according to claim 1, wherein each photodetector signal pulse is a voltage pulse.

8. The method according to claim 1, wherein light detected from the particle is scattered light.

9. The method according to claim 8, wherein light detected in the first photodetector channel comprises scattered light from the particle irradiated by the first laser.

10. The method according to claim 8, wherein light detected in the second photodetector channel comprises scattered light from the particle irradiated by the second laser.

11. The method according to claim 3, wherein velocity for each particle in the flow stream is calculated based on:

the amount of time between the first photodetector signal pulse and the second photodetector signal pulse; and a distance between the interrogation region of the first laser and the interrogation region of the second laser.

12. The method according to claim 1, wherein the particle analyzer comprises a flow cell having a flow cell nozzle for generating a droplet containing each particle.

13. The method according to claim 12, wherein the drop delay for each particle is determined by multiplying the calculated velocity for each particle in the flow stream by the distance between the first interrogation region or second interrogation region and an orifice of the flow cell nozzle.

14. The method according to claim 1, wherein the method further comprises adjusting one or more parameters of the particle analyzer based on one or more of the calculated velocity for each particle in the flow stream and the calculated drop delay.

15. The method according to claim 14, wherein the method comprises increasing or decreasing the flow rate of the flow stream based on one or more of the calculated velocity for each particle in the flow stream and the calculated drop delay.

16. The method according to claim 1, wherein the method comprises:

irradiating the sample in the flow stream with the first laser, the second laser, and a third laser at the first interrogation region, the second interrogation region and a third interrogation region, respectively;

detecting light from each particle in a plurality of photodetector channels;

generating a photodetector signal pulse in response to the detected light in each of the photodetector channels; and calculating the velocity for each particle in the sample based on the photodetector signal pulses in two or more of the photodetector channels based on one or more of a distance between the first interrogation region and the second interrogation region, and a distance between the second interrogation region and the third interrogation region.

17. The method according to claim 1, wherein the drop delay of each particle is determined on an integrated circuit.

18. The method according to claim 16, wherein the distance between the first interrogation region and the second interrogation region is different from the distance between the second interrogation region and the third interrogation region.

19. The method according to claim 16, wherein the velocity for each particle in the flow stream is calculated based on photodetector signal pulses in three of the photodetector channels.

20. A method for adjusting a droplet charge timing for a particle in a flow stream in a particle analyzer, the method comprising:

irradiating in a cuvette a sample comprising the particle in the flow stream with a first laser in a first interrogation region within the cuvette and a second laser in a second interrogation region within the cuvette;

detecting light from the particle in a first photodetector channel and a second photodetector channel;

generating a first photodetector signal pulse in response to the light detected in the first photodetector channel;

generating a second photodetector signal pulse in response to the light detected in the second photodetector channel;

determining the first order moment of the first photodetector signal pulse and the second photodetector signal pulse;

calculating a velocity for the particle in the flow stream based on the first order moment of the first photodetector signal pulse and the second photodetector signal pulse;

determining the drop delay of the particle based on the calculated velocity for the particle; and adjusting the droplet charge timing for the particle based on the drop delay.

21. A method for adjusting a droplet charge timing for a particle in a flow stream in a particle analyzer, the method comprising:

irradiating in a cuvette a sample comprising the particle in the flow stream with a first laser in a first interrogation region and a second laser in a second interrogation region and a third laser in a third interrogation region, wherein the distance between the first interrogation region and the second interrogation region is different from the distance between the second interrogation region and the third interrogation region;

detecting light from the particle in a plurality of photo-detector channels;

generating a photodetector signal pulse in response to the detected light in each of the photodetector channels;

calculating a velocity for the particle in the flow stream based on the photodetector signal pulses in two or more of the photodetector channels based on one or more of a distance between the first interrogation region and the second interrogation region, and a distance between the second interrogation region and the third interrogation region;

determining the drop delay of the particle based on the calculated velocity for the particle; and adjusting the droplet charge timing for the particle based on the drop delay.

\*   \*   \*   \*   \*